US012646437B2

(12) United States Patent
Kim

(10) Patent No.: US 12,646,437 B2
(45) Date of Patent: Jun. 2, 2026

(54) DISPLAY DEVICE

(71) Applicant: LG Display Co., Ltd., Seoul (KR)

(72) Inventor: Jiyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/018,947

(22) Filed: Jan. 13, 2025

(65) Prior Publication Data

US 2025/0273121 A1 Aug. 28, 2025

(30) Foreign Application Priority Data

Feb. 28, 2024 (KR) ........................ 10-2024-0029001

(51) Int. Cl.
*G09G 3/20* (2006.01)
*G09G 3/3233* (2016.01)

(52) U.S. Cl.
CPC ......... *G09G 3/2092* (2013.01); *G09G 3/2018* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01)

(58) Field of Classification Search
CPC .. G09G 3/3233; G09G 3/2092; G09G 3/2018; G09G 2300/0861; G09G 2300/0842; G09G 2300/0819; G09G 2310/08; G09G 2320/0247
USPC .................................................... 345/691, 76
See application file for complete search history.

(56) References Cited

U.S. PATENT DOCUMENTS

2023/0009494 A1* 1/2023 Noh ..................... G09G 3/3266
2023/0070610 A1* 3/2023 Zhang .................. G09G 3/3291
2023/0386404 A1* 11/2023 Kim ..................... G09G 3/3233

* cited by examiner

*Primary Examiner* — Jimmy H Nguyen
(74) *Attorney, Agent, or Firm* — Fenwick & West LLP

(57) ABSTRACT

A display device includes a display panel including pixels, data lines and gate lines; a data driver connected to the data lines; a gate driver connected to the gate lines; and a timing controller configured to control the data driver and the gate driver, wherein when a frame of the display panel has switched from a black frame to a gray frame, the timing controller is configured to output a scan signal having an adjusted pulse width for a gray frame immediately subsequent to the black frame.

13 Claims, 9 Drawing Sheets

DISPLAY DEVICE

CROSS-REFERENCE TO RELATED APPLICATION

This application claims priority from Republic of Korea Patent Application No. 10-2024-0029001 filed on Feb. 28, 2024, which is hereby incorporated by reference in its entirety.

FIELD

The present disclosure relates to a display device.

DESCRIPTION OF RELATED ART

Recently, the most widely developed display devices include a liquid crystal display (LCD) device, an organic light-emitting diode (OLED) display device, and a quantum dot light-emitting diode (QLED) display device.

Among these display devices, a display panel of the liquid crystal display device does not have a self-light-emitting means.

Accordingly, the liquid crystal display device requires a separate backlight that supplies light to the display panel. In this regard, a light-emitting diode LED is used as a light source of the backlight.

The OLED and QLED display devices has OLED and QLED that emits light on its own, and thus does not require a separate backlight, and thus has a fast response speed, high luminous efficiency, high luminance, and large viewing angle.

SUMMARY

The display device has a problem in that response characteristics and flicker characteristics are traded off with each other depending on voltage intensity.

Accordingly, the inventors of the present disclosure have invented a display device that may satisfy both the flicker characteristics and the response characteristics of a driving transistor.

A technical purpose according to one embodiment of the present disclosure is to provide a display device including a display panel that may satisfy both the flicker characteristics and the response characteristics of a driving transistor.

Purposes according to the present disclosure are not limited to the above-mentioned purpose. Other purposes and advantages according to the present disclosure that are not mentioned may be understood based on following descriptions and may be more clearly understood based on embodiments according to the present disclosure. Further, it will be easily understood that the purposes and advantages according to the present disclosure may be realized using means shown in the claims or combinations thereof.

A display device according to one embodiment of the present disclosure may include a display panel including pixels, data lines and gate lines; a data driver connected to the data lines; a gate driver connected to the gate lines; and a timing controller configured to control the data driver and the gate driver, wherein when a frame of the display panel has switched from a black frame to a gray frame, the timing controller is configured to output a scan signal having an adjusted pulse width for a gray frame immediately subsequent to the black frame.

According to one embodiment of the present disclosure, while the display panel is operated at a low frequency, the timing controller is configured to output the scan signal having the adjusted pulse width for the gray frame immediately subsequent to the black frame when a frame of the display panel has switched from the black frame to the gray frame. Thus, the trade-off relationship between the response characteristics of the driving transistor and the flicker characteristics may be resolved such that both the response characteristics of the driving transistor and the flicker characteristics may be improved.

Furthermore, according to one embodiment of the present disclosure, the hysteresis of the driving transistor which may occur when the frame of the display panel has switched from the black frame to the gray frame may be removed.

Furthermore, according to one embodiment of the present disclosure, when the frame of the display panel has switched from the black frame to the gray frame, the timing controller may be configured to output the scan signal having the adjusted pulse width for the gray frame immediately subsequent to the black frame, such that the touch efficiency of the display device may be increased, and the display device may operate at a low power level, thereby reducing the power consumption.

Effects of the present disclosure are not limited to the effects mentioned above, and other effects not mentioned will be clearly understood by those skilled in the art from the description as set forth below.

In addition to the above effects, specific effects of the present disclosure are described together while describing specific details for carrying out the present disclosure.

DETAILED DESCRIPTION

Figure 1:
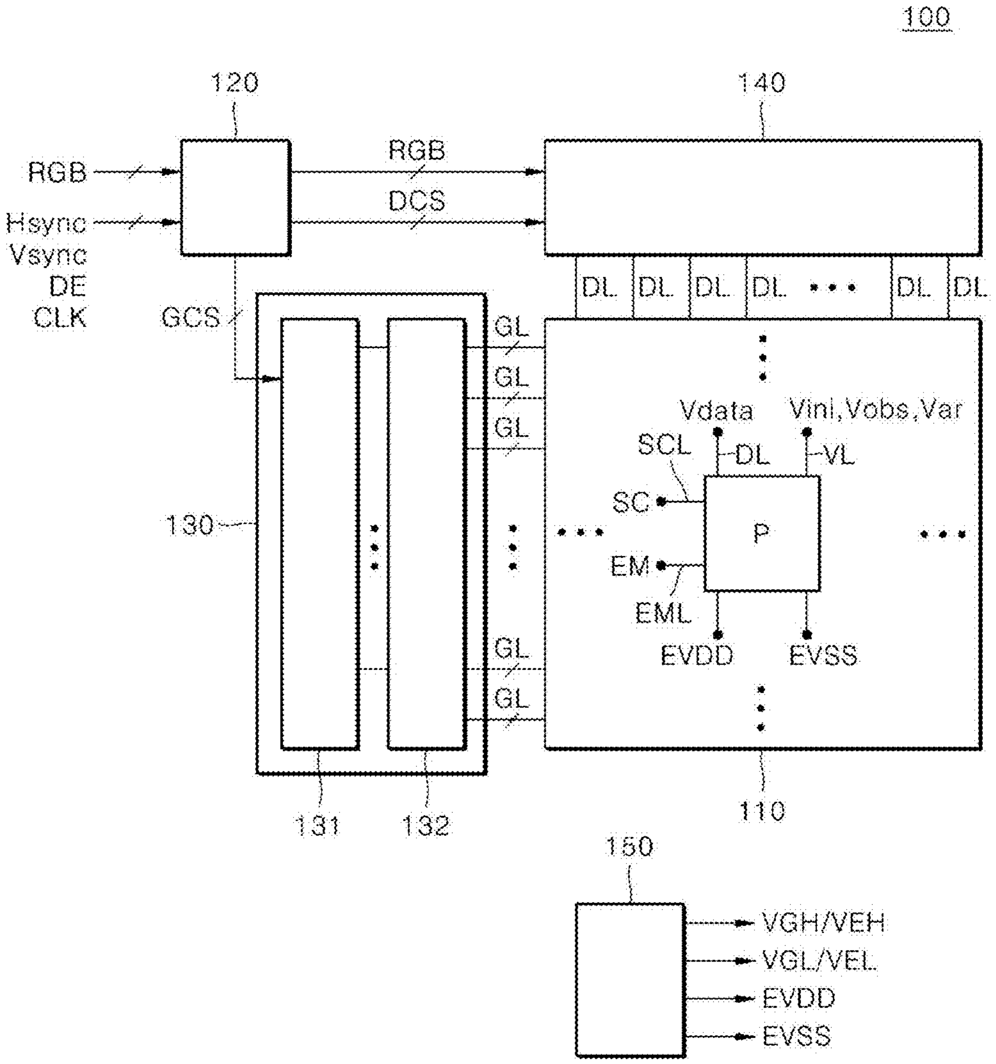
FIG. 1 is a block diagram schematically showing a display device according to one embodiment of the present disclosure.

Advantages and features of the present disclosure, and a method of achieving the advantages and features will become apparent with reference to embodiments described below in detail together with the accompanying drawings. However, the present disclosure is not limited to the embodiments as disclosed under, but may be implemented in various different forms. Thus, these embodiments are set forth only to make the present disclosure complete, and to entirely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items.

Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when a first element or layer is referred to as being "connected to", or "coupled to" a second element or layer, the first element may be directly connected to or coupled to the second element or layer, or one or more intervening elements or layers may be present therebetween. In addition, it will also be understood that when an element or layer is referred to as being "between" two elements or layers, it may be the only element or layer between the two elements or layers, or one or more intervening elements or layers may also be present therebetween.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or periods, these elements, components, regions, layers and/or periods should not be limited by these terms. These terms are used to distinguish one element, component, region, layer or section from another element, component, region, layer or section. Thus, a first element, component, region, layer or section as described under could be termed a second element, component, region, layer or section, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other and may be technically associated with each other or operate with each other. The embodiments may be implemented independently of each other and may be implemented together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description as set forth below have been selected as being general and universal in the related technical field. However, there may be other terms than the terms depending on the development and/or change of technology, convention, preference of technicians, etc. Therefore, the terms used in the description as set forth below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description as set forth below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Throughout the present disclosure, "A and/or B" means A, B, or A and B, unless otherwise specified, and "C to D" means C inclusive to D inclusive unless otherwise specified.

Hereinafter, a display device according to each of embodiments of the present disclosure is described with reference to the attached drawings. In describing an embodiment, descriptions of components in a corresponding embodiment identical with or similar to those of previous embodiments will be omitted.

FIG. 1 is a block diagram schematically showing a display device according to one embodiment of the present disclosure.

Referring to FIG. 1, a display device 100 according to one embodiment of the present disclosure may include a display panel 110, a timing controller 120, a gate driver 130, a data driver 140, and a power supply 150.

A configuration of the display device 100 illustrated in FIG. 1 is an example according to one embodiment, and the components of the display device 100 are not limited to the embodiment illustrated in FIG. 1, and some components may be added, changed, or deleted as needed.

According to one embodiment, the display panel 110 may include at least one pixel P. The display panel 110 may include a display area (AA of FIG. 3) where the pixel P is located and a non-display area (NA of FIG. 3). The non-display area (NA of FIG. 3) may surround the display area. A gate driver 130 and a data driver 140 may be disposed in the non-display area (NA of FIG. 3).

According to one embodiment, a plurality of gate lines GL and a plurality of data lines DL may be disposed in the display panel 110. Each of a plurality of pixels P in the display panel 110 may be connected to the gate line GL and the data line DL. The plurality of gate lines GL and the plurality of data lines DL may extend to intersect each other.

The gate driver 130 may be configured to supply a gate signal to each of the plurality of pixels P. The data driver 140 may supply a data signal to each of the plurality of pixels P. The power supply 150 may be configured to supply power required for driving each of the plurality of pixels P thereto.

For example, each pixel P may receive the gate signal from the gate driver 130 through the gate line GL and the data signal from the data driver 140 through the data line DL. In addition, each pixel P may receive a high-potential driving voltage EVDD and a low-potential driving voltage EVSS from the power supply 150. However, embodiments of the present disclosure are not limited thereto.

The gate line GL may supply a scan signal SC and a light-emission control signal EM. The data line DL may supply a data voltage Vdata. Furthermore, according to various embodiments, the gate line GL may include a plurality of scan lines SCL supplying the scan signal SC and a light-emission control signal line EML supplying the light-emission control signal EM. Furthermore, the display panel 110 may additionally include a power line VL. Thus, each pixel P may receive a bias voltage Vobs and an initialization voltage Var and Vini via the power line VL.

Figure 2:
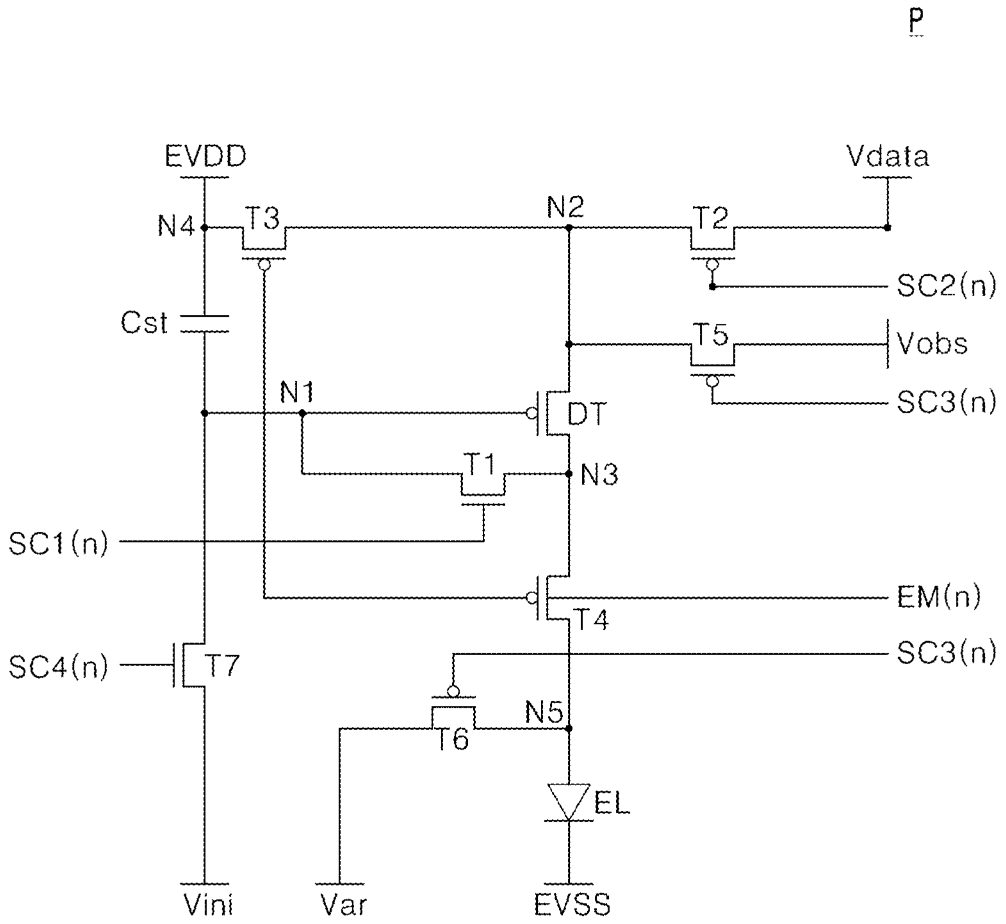
FIG. 2 is an example diagram showing a pixel circuit in a display panel according to one embodiment of the present disclosure.
Figure 3:
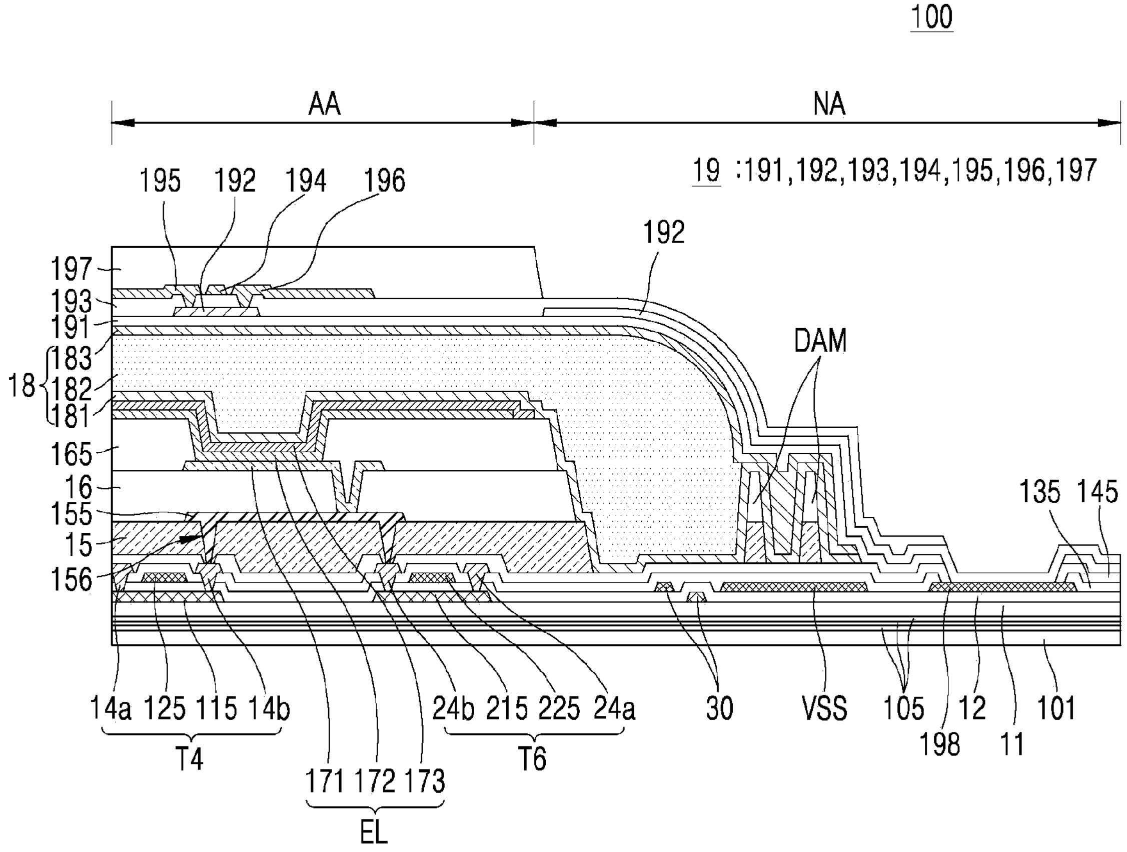
FIG. 3 is a cross-sectional diagram showing a display device according to one embodiment of the present disclosure.

Furthermore, as illustrated in FIG. 2, each pixel P may include a light-emitting element EL and a pixel circuit that controls an operation of the light-emitting element EL. In this regard, the light-emitting element EL may be composed of an anode electrode 171, a cathode electrode 173, and a light-emitting layer 172 between the anode electrode 171 and the cathode electrode 173, as illustrated in FIG. 3. However, embodiments of the present disclosure are not limited thereto.

According to one embodiment, the pixel circuit may include a plurality of switching elements, a driving element, and a capacitor. However, embodiments of the present disclosure are not limited thereto. Each of the switching element and the driving element may be embodied as a thin-film transistor. In the pixel circuit, the driving element may control an amount of current supplied to the light-emitting element EL based on a data voltage to adjust an amount of light emission of the light-emitting element EL.

Furthermore, each of the plurality of switching elements may receive the scan signal SC supplied through each of the plurality of scan lines SCL and the light-emission control signal EM supplied through the light-emission control signal line EML and switch the pixel circuit based on the scan signal and the light-emission control signal. The light-emission control signal EM may be referred to as a 'light-emission signal EM'. However, embodiments of the present disclosure are not limited thereto.

According to one embodiment, the display panel 110 may be embodied as a non-transmissive display panel or a transmissive display panel. The transmissive display panel may be applied to a transparent display device where an image is displayed on a screen and a real object in a background is visible to a viewer in front of the display device. The display panel 110 may be manufactured as a flexible display panel. However, embodiments of the present disclosure are not limited thereto. The flexible display panel may be embodied as an OLED panel using a plastic substrate. However, embodiments of the present disclosure are not limited thereto.

According to one embodiment, the pixels P may include a red pixel, a green pixel, and a blue pixel to emit light of corresponding colors. However, embodiments of the present disclosure are not limited thereto. The pixels P may further include a white pixel. Each of the pixels P may include a pixel circuit.

According to one embodiment, a touch unit or touch sensors may be disposed on the display panel 110. Touch input may be sensed using separate touch sensors or may be sensed through the pixels P. The touch sensors may be disposed on the screen of the display panel in an on-cell type or add-on type or may be embodied as in-cell type touch sensors built into the display panel 110. However, embodiments of the present disclosure are not limited thereto.

According to one embodiment, the timing controller 120 may be configured to process image data RGB input from an external source such as a host system so as to be adapted to a size and a resolution of the display panel 110 and to supply the processed image data to the data driver 140. The timing controller 120 may be configured to generate a gate control signal GCS and a data control signal DCS based on synchronization signals, for example, a dot clock signal CLK, a data enable signal DE, a horizontal synchronization signal Hsync, and a vertical synchronization signal Vsync input from the external source.

The timing controller 120 may be configured to supply the generated gate control signal GCS and data control signal DCS to the gate driver 130 and the data driver 140, respectively, thereby controlling the gate driver 130 and the data driver 140.

According to one embodiment, the timing controller 120 may be configured to be coupled to various processors, for example, a microprocessor, a mobile processor, an application processor, etc., depending on a type of a device on which the controller is mounted. However, embodiments of the present disclosure are not limited thereto.

According to one embodiment, the host system may be any one of a television (TV) system, a set top box, a navigation system, a personal computer (PC), a home theater system, a mobile device, a wearable device, and a vehicle system. However, embodiments of the present disclosure are not limited thereto.

According to one embodiment, the timing controller 120 multiplies an input frame frequency by i and controls an operation timing of each of the gate driver 130 and the data driver 140 using a frame frequency=the input frame frequency×i (i is a positive integer greater than 0) Hz. The input frame frequency is 60 Hz in the National Television Standards Committee (NTSC) scheme and is 50 Hz in the Phase-Alternating Line (PAL) scheme. However, embodiments of the present disclosure are not limited thereto.

According to one embodiment, the timing controller 120 may be configured to generate and output a signal so that the pixel may operate at various refresh rates. That is, the timing controller 120 may be configured to generate and output operation-related signals such that the pixel may operate in a Variable Refresh Rate (VRR) mode or a refresh rate thereof may be switchable to between a first refresh rate and the second refresh rate.

For example, the timing controller 120 may be configured to simply change a rate of a clock signal, to generate a synchronization signal to generate a horizontal blank or a vertical blank, or to operate the gate driver 130 in a mask manner such that the pixel P may operate at various refresh rates.

According to one embodiment, the timing controller 120 may be configured to control the data driver 140 and the gate driver 130. The display device 100 may be adopted in a small device such as a smart phone and may operate in an AoD (Always on Display) mode. The display device may operate at a low frequency to reduce power consumption in the AoD mode. The timing controller 120 may be configured to generate (or output) at least one scan signal having an adjusted pulse width for a gray frame into which a frame of the display panel 110 has switched from a black frame while the display panel 110 operates in the AoD (Always on Display) mode at a low frequency (for example, 1 Hz). Then, the timing controller 120 may be configured to transmit the generated (or output) at least one scan signal to the gate driver 130.

The timing controller 120 may be configured to generate at least one scan signal having an adjusted pulse width for a gray frame into which the frame of the display panel 110 has switched from the black frame while the display panel 110 operates at a different frequency from 1 Hz, for example, 10 Hz, 30 Hz, 60 Hz, or 120 Hz. Then, the timing controller 120 may be configured to transmit the generated at least one scan signal to the gate driver 130.

For example, when the display panel 110 operates at 1 Hz, one data scan and 239 bias scans may be performed for one frame. However, embodiments of the present disclosure are not limited thereto. Furthermore, when the display panel 110 operates at 10 Hz, one data scan and 23 bias scans may be performed for one frame. However, embodiments of the present disclosure are not limited thereto. In another example, when the display panel 110 operates at 30 Hz, one data scan and 7 bias scans may be performed for one frame. However, embodiments of the present disclosure are not limited thereto. In another example, when the display panel 110 operates at 60 Hz, one data scan and 3 bias scans may be performed for one frame. However, embodiments of the present disclosure are not limited thereto. In another example, when the display panel 110 operates at 120 Hz, one data scan and one bias scan may be performed for one frame. However, embodiments of the present disclosure are not limited thereto.

According to one embodiment, the timing controller 120 may be configured to insert a timing of an on bias into each of a plurality of sub-frames in the gray frame into which the frame of the display panel 110 has been switched from the black frame. For example, the plurality of sub-frames may be at least two sub-frames. However, embodiments of the present disclosure are not limited thereto.

Furthermore, the timing controller 120 may be configured to adjust a pulse width (for example, adjust a turn-on time or a turn-off time) within a data scan period in each of the plurality of sub-frames in the gray frame. The adjusting of the pulse width may satisfy both the flicker characteristics and the response characteristics of the driving transistor while the display panel 110 operates at a low frequency. The luminance change over time may be converted to into the luminance change over frequency to identify the flicker characteristics. A frequency with the largest gain in the frequency domain is referred to as a flicker frequency. Thus, whether the flicker characteristics are superior or inferior may be identified based on the flicker frequency.

For example, when a frame of the display panel has switched from a black frame to a gray frame, hysteresis may occur in the driving transistor. Therefore, a pulse width of a scan signal in the gray frame into which the black frame has been switched may be adjusted to resolve the hysteresis.

For example, the data scan period may include an off bias period to minimize a difference between characteristics of the gate node of the driving transistor for different frames, an initialization period to resolve the hysteresis of the driving transistor and initialize the gate node of the driving transistor, a sampling period to write the data voltage to the gate node of the driving transistor, and an on bias period to balance the voltage of the data scan period and the voltage of the bias scan period with each other.

According to one embodiment, the timing controller 120 may be configured to adjust the pulse width of at least one scan signal within each of the off-bias period and the initialization period.

Further, the timing controller 120 may be configured to generate (or output) a scan signal having an adjusted pulse width for the gray frame into which the frame of the display panel has switched from the black frame. For example, the timing controller 120 may be configured to generate (or output) a third scan signal and a fourth scan signal, each having an adjusted pulse width.

According to one embodiment, when the timing controller 120 has transmitted the control signal to the gate driver 130, the gate driver 130 may generate (or output) a first scan signal, a second scan signal, the third scan signal, and the fourth scan signal. The first scan signal may be a signal that turns on a first transistor T1, and the second scan signal may be a signal that turns on a second transistor T2. The third scan signal may be a signal for turning on a sixth transistor T6 before (or after) the light-emitting element EL emits light, and the fourth scan signal may be a signal for turning on the seventh transistor T7.

According to one embodiment, the timing controller 120 may be configured to add a pulse indicating a start of the timing of the on-bias to the fourth scan signal to generate (or output) the fourth scan signal. Further, the timing controller 120 may be configured to generate (or output) the fourth scan signal having the added pulse thereof before the third scan signal is turned on. In this regard, the on-bias timing may be set to a period from a start time of the pulse added to the fourth scan signal to a time at which the third scan signal is turned off. The third scan signal may include a pulse that is turned on at the start time of the added pulse to the fourth scan signal.

According to one embodiment, the timing controller 120 may be configured to generate a gate control signal GCS for controlling an operation timing of the gate driver 130 and a data control signal DCS for controlling an operation timing of the data driver 140 based on the timing signals such as the vertical synchronization signal Vsync, the horizontal synchronization signal Hsync, and the data enable signal DE received from the host system. The timing controller 120 may be configured to control the operation timing of each of the gate driver 130 and the data driver 140 to synchronize the gate driver 130 and the data driver 140 with each other.

According to one embodiment, a voltage level of the gate control signal GCS output from the timing controller 120 may be converted into a gate-on voltage VGL and VEL and a gate-off voltage VGH and VEH via a level shifter. The gate-on voltage VGL and VEL and the gate-off voltage VGH and VEH may be supplied to the gate driver 130. The level shifter may convert a low-level voltage of the gate control signal GCS into the gate-on voltage VGL with a gate low voltage and may convert a high-level voltage of the gate control signal GCS into the gate-off voltage VGH with a gate high voltage. The gate control signal GCS may include a start pulse and a shift clock.

According to one embodiment, the gate driver 130 may be configured to supply the scan signal SC to the gate line GL based on the gate control signal GCS supplied from the timing controller 120. The gate driver 130 may be disposed at one side or each of both opposing sides of the display panel 110 in a GIP (Gate In Panel) manner. However, embodiments of the present disclosure are not limited thereto.

According to one embodiment, the gate driver 130 may be configured to sequentially output the gate signal to the plurality of gate lines GL under control of the timing controller 120. The gate driver 130 may be configured to shift the gate signal using a shift register and sequentially supply the shifted gate signal to the gate lines GL.

For example, the gate signal may include the scan signal SC and the light-emission control signal EM in the display device. The scan signal SC may include a scan pulse swinging between a gate on voltage VGL and a gate off voltage VGH. The light-emission control signal EM may include a light-emission control signal pulse that swings between the gate on voltage VEL and the gate off voltage VEH.

The scan pulse may be synchronized with the data voltage Vdata to select pixels P of a line to which data is to be written. The light-emission control signal EM may define a light-emission time of each of the pixels P.

According to one embodiment, the gate driver 130 may be configured to include a light-emission control signal driver that outputs the light-emission control signal EM and a scan driver that outputs at least one scan signal SC.

For example, the light-emission control signal driver may output the light-emission control signal pulse in response to a start pulse and a shift clock from the timing controller 120 and may sequentially shift the light-emission control signal pulse according to the shift clock.

For example, at least one scan driver may output a scan pulse in response to a start pulse and a shift clock from the timing controller 120 and may shift the scan pulse according to the shift clock timing.

According to one embodiment, the data driver 140 may convert the image data RGB into the data voltage Vdata based on the data control signal DCS supplied from the timing controller 120 and supply the converted data voltage Vdata to the pixel P through the data line DL.

According to one embodiment, the power supply 150 may be configured to generate DC power required to drive a pixel array of the display panel 110 and the display panel driver including the gate driver and the data driver using a DC-DC converter. The DC-DC converter may include a charge pump, a regulator, a buck converter, a boost converter, etc. However, embodiments of the present disclosure are not limited thereto. The power supply 150 may be configured to receive a DC input voltage applied from the host system and generate a DC voltage such as the gate-on voltage VGL and VEL, the gate-off voltage VGH and VEH, the high-potential driving voltage EVDD, and the low-potential driving voltage EVSS. The gate-on voltage VGL and VEL and the gate-off voltage VGH and VEH may be supplied to the level shifter and the gate driver 130. Each of the high-potential driving voltage EVDD and the low-potential driving voltage EVSS may be commonly supplied to the pixels P.

FIG. 2 is an example diagram of a pixel circuit in a display panel according to an embodiment of the present disclosure.

FIG. 2 only shows an example of a pixel circuit for illustration. A structure of the pixel circuit is not limited particularly as long as the structure thereof may apply a light-emission control signal EM (n) to the pixel to control the light-emission of the light-emitting element EL. For example, the pixel circuit may include a switching thin-film transistor connected to an additional scan signal, and a switching thin-film transistor to which an additional initialization voltage is applied. A connection relationship of the switching element or a connection position of the capacitor may vary. Hereinafter, for convenience of description, a display device with the pixel circuit structure of FIG. 2 is described. However, embodiments of the present disclosure are not limited thereto.

Referring to FIG. 2, each of the plurality of pixels P according to an embodiment of the present disclosure may include a pixel circuit having a driving transistor DT and the light-emitting element EL connected to the pixel circuit. However, embodiments of the present disclosure are not limited thereto.

According to one embodiment, the pixel circuit may control the driving current flowing through the light-emitting element EL to drive the light-emitting element EL. The pixel circuit may include the driving transistor DT, the first to seventh transistors T1 to T7, and the capacitor Cst. Each of the transistors DT, and T1 to T7 may include a first electrode, a second electrode, and a gate electrode. One of the first electrode and the second electrode may be a source electrode, and the other of the first electrode and the second electrode may be a drain electrode.

According to one embodiment, each of the transistors DT, and T1 to T7 may be a P type thin-film transistor or an N type thin-film transistor. In an embodiment of FIG. 2, the first transistor T1 and the seventh transistor T7 are embodied as N type thin-film transistors, and the remaining transistors DT, and T2 to T6 are embodied as P type thin-film transistors. However, embodiments of the present disclosure are not limited thereto. According to an embodiment, each of all or some of the transistors DT, and T1 to T7 may be a P type thin-film transistor or an N type thin-film transistor. Furthermore, the N type thin-film transistor may be embodied as an oxide thin-film transistor and the P type thin-film transistor may be embodied as a low temperature polycrystalline silicon (LTPS) thin-film transistor. For example, one of the transistors DT, T1 to T7 may be embodied as one or a combination of the oxide thin-film transistor and the low temperature polycrystalline silicon (LTPS) thin-film transistor.

Hereinafter, an example in which the first transistor T1 and the seventh transistor T7 are embodied as N type thin-film transistors, and the remaining transistors DT, and T2 to T6 are embodied as P type thin-film transistors is described. However, embodiments of the present disclosure are not limited thereto. Accordingly, each of the first transistor T1 and the seventh transistor T7 may be turned on when a high voltage is applied thereto. Each of the remaining transistors DT, and T2 to T6 may be turned on when a low voltage is applied thereto.

According to one embodiment, the first transistor T1 constituting the pixel circuit may function as a compensation transistor, the second transistor T2 may function as a data supply transistor, each of the third and fourth transistors T3 and T4 may function as a light-emission control transistor, the fifth transistor T5 may function as a bias transistor, and each of the sixth and seventh transistors T6 and T7 may function as an initialization transistor. However, embodiments of the present disclosure are not limited thereto. Additionally, the sixth transistor T6 may function as a reset transistor for resetting the anode electrode of the light-emitting element (EL) among initialization transistors. However, embodiments of the present disclosure are not limited thereto.

According to one embodiment, the light-emitting element EL may include a first electrode and a second electrode. The first electrode of the light-emitting element EL may be an anode electrode, and the second electrode of the light-emitting element EL may be a cathode electrode. The anode electrode of the light-emitting element EL may be connected to a fifth node N5, and the cathode electrode thereof may be connected to the low-potential driving voltage EVSS.

According to one embodiment, the driving transistor DT may include a first electrode connected to a second node N2, a second electrode connected to a third node N3, and a gate electrode connected to a first node N1. The driving transistor DT may provide a driving current Id to the light-emitting element EL based on a voltage of the first node N1 or a data voltage stored in the capacitor Cst, which will be described later. For example, the driving transistor DT may be connected to and disposed between the third node N3 and the second node N2.

According to one embodiment, the first transistor T1 may include a first electrode connected to the first node N1, a second electrode connected to the third node N3, and a first gate electrode that receives a first scan signal SC1(*n*). The first transistor T1 may be turned on in response to the first scan signal SC1(*n*) such that a diode connection between the first node N1 and the third node N3 is established to sample a threshold voltage Vth of the driving transistor DT. This first transistor T1 may act as a compensation transistor. However, embodiments of the present disclosure are not limited thereto. For example, the first transistor T1 may be connected to and disposed between the third node N3 and the first node N1.

According to one embodiment, the capacitor Cst may be connected to and disposed between the first node N1 and the fourth node N4. The capacitor Cst may store therein or maintain the high potential driving voltage EVDD supplied thereto.

According to one embodiment, the second transistor T2 may include a first electrode connected to the data line DL or receiving the data voltage Vdata, a second electrode connected to the second node N2, and a second gate electrode receiving a second scan signal SC2(*n*). The second transistor T2 may be turned on in response to the second scan signal SC2(*n*) and thus may transmit the data voltage Vdata to the second node N2. This second transistor T2 may act as a data supply transistor. However, embodiments of the present disclosure are not limited thereto. The second transistor T2 may be connected to and disposed between the data line and the second node N2. According to one embodiment, the third transistor T3 and the fourth transistor T4 (or the first and second light-emission control transistors) may be connected to and disposed between the high potential driving voltage EVDD and the light-emitting element EL and may establish a current flow path through which the driving current Id generated by the driving transistor DT flows.

According to one embodiment, the third transistor T3 may include a first electrode connected to the fourth node N4 to receive the high potential driving voltage EVDD, a second electrode connected to the second node N2, and a third gate electrode that receives the light-emission control signal EM (n). The third transistor T3 may be connected to and disposed between the fourth node N4 and the second node N2.

According to one embodiment, the fourth transistor T4 may include a first electrode connected to the third node N3, a second electrode connected to the fifth node N5 (or the anode electrode of the light-emitting element EL), and a fourth gate electrode that receives the light-emission control signal EM (n). The fourth transistor T4 may be connected to and disposed between the third node N3 and the fifth node N5.

According to one embodiment, each of the third and fourth transistors T3 and T4 may be turned on in response to the light-emission control signal EM (n). In this case, the driving current Id may be provided to the light-emitting element EL, such that the light-emitting element EL may emit light at a luminance level corresponding to the driving current Id.

According to one embodiment, the fifth transistor T5 may include a first electrode receiving the bias voltage Vobs, a second electrode connected to the second node N2, and a fifth gate electrode receiving a third scan signal SC3(*n*). This fifth transistor T5 may be a bias transistor. However, embodiments of the present disclosure are not limited thereto. The fifth transistor T5 may be connected to and disposed between a bias voltage line and the second node N2.

According to one embodiment, the sixth transistor T6 may include a first electrode receiving a first initialization voltage Var, a second electrode connected to the fifth node N5, and a sixth gate electrode receiving the third scan signal SC3(*n*). The first electrode of the sixth transistor T6 may be connected to the reset voltage line. The sixth transistor T6 may be connected to and disposed between a first initialization voltage line and the fifth node N5.

According to one embodiment, the sixth transistor T6 may be turned on in response to the third scan signal SC3(*n*) before the light-emitting element EL emits light (or after the light-emitting element EL emits light), such that the anode electrode (or the pixel electrode) of the light-emitting element EL may be initialized based on the first initialization voltage Var.

The light-emitting element EL may have a parasitic capacitor generated between the anode electrode and the cathode electrode. Thus, while the light-emitting element EL emits light, the parasitic capacitor may be charged so that the anode electrode of the light-emitting element EL may have a specific voltage. Accordingly, an amount of charge accumulated in the light-emitting element EL may be initialized by applying the first initialization voltage Var to the anode electrode of the light-emitting element EL via the sixth transistor T6.

In the present disclosure, the fifth and sixth transistors T5 and T6 are configured such that the gate electrodes of the fifth and sixth transistors T5 and T6 commonly receive the third scan signal SC3(*n*). However, embodiments of the present disclosure are not necessarily limited thereto, and the fifth and sixth transistors T5 and T6 are configured such that the gate electrodes of the fifth and sixth transistors T5 and T6 receive separate scan signals and thus the fifth and sixth transistors T5 and T6 independently operate.

According to one embodiment, the seventh transistor T7 may include a first electrode receiving a second initialization voltage Vini, a second electrode connected to the first node N1, and a seventh gate electrode receiving a fourth scan signal SC4(*n*). The seventh transistor T7 may be connected to and disposed between a second initialization voltage line and the first node N1.

According to one embodiment, the seventh transistor T7 may be turned on in response to the fourth scan signal SC4(*n*) such that the gate electrode of the driving transistor DT may be initialized using the second initialization voltage Vini. Unnecessary charges may remain in the gate electrode of the driving transistor DT due to the high-potential driving voltage EVDD stored in the capacitor Cst. Accordingly, an amount of the remaining charges may be initialized by applying the second initialization voltage Vini to the gate electrode of the driving transistor DT via the seventh transistor T7.

FIG. 3 is a cross-sectional view showing a display device according to an embodiment of the present disclosure.

Referring to FIG. 3, the display device 100 according to an embodiment of the present disclosure may have a fourth transistor T4 disposed on a substrate 101. The fourth transistor T4 may include a fourth semiconductor layer 115, a fourth gate electrode 125, and source and drain electrodes 14*a* and 14*b* referred to as a first electrode and a second electrode thereof, respectively. The substrate 101 may include the display area AA and the non-display area NA. The display area AA may display an image. The non-display area NA may be disposed around the display area AA or surround the display area AA. The fourth transistor T4 may act as a light-emission control transistor for driving a light-emitting element EL in the display area AA. However, embodiments of the present disclosure are not limited thereto.

According to one embodiment of the present disclosure, the display device 100 may have a sixth transistor T6 disposed on the substrate 101.

The sixth transistor T6 may include a sixth semiconductor layer 215, a sixth gate electrode 225, and source and drain electrodes 24*a* and 24*b* referred to as a first electrode and a second electrode thereof, respectively. The sixth transistor T6 may act as a reset transistor for resetting an anode electrode of a light-emitting element EL in the display area AA. However, embodiments of the present disclosure are not limited thereto.

For convenience of illustration, the fourth transistor T4 and the sixth transistor T6 among various thin-film transistors that may be included in the display device 100 are illustrated. However, another thin-film transistor acting as a switching transistor may be included in the display device 100. Furthermore, an example in which the thin-film transistor has a coplanar structure is described. However, the thin-film transistor may be implemented to have other structures such as a staggered structure. However, embodiments of the present disclosure are not limited thereto.

According to one embodiment, the fourth transistor T4 may receive the high-potential driving voltage EVDD in response to the light-emission control signal EM supplied to the fourth gate electrode 125 thereof and control the current to be supplied to the light-emitting element EL, based on the received high-potential driving voltage EVDD, thereby controlling the light-emitting amount of the light-emitting element EL. The fourth transistor T4 may allow a constant current to be supplied to the light-emitting element EL using a voltage charged in the storage capacitor Cst until a data signal of a next frame is supplied thereto, such that the light-emitting element EL may maintain the light-emission state. A high-voltage supply line may extend in a parallel manner to the data line. However, embodiments of the present disclosure are not limited thereto.

According to one embodiment, the sixth transistor T6 may receive a first initialization voltage (reset voltage signal) Var in response to the scan signal SC supplied to the sixth gate electrode 225 thereof and transmit the reset voltage signal to an anode electrode (which is connected to the fifth node N5) as a first electrode of the light-emitting element EL, thereby causing the anode electrode of the light-emitting element EL to be reset.

According to one embodiment, the fourth transistor T4 may include the fourth semiconductor layer 115, the fourth gate electrode 125, and the source and drain electrodes 14*a* and 14*b*, as illustrated in FIG. 3. Although a case where the first electrode of the fourth transistor T4 is a source electrode and the second electrode is a drain electrode is schematically illustrated, embodiments of the present disclosure are not limited thereto. Alternatively, when the first electrode thereof is a drain electrode, the second electrode thereof may be a source electrode. The fourth semiconductor layer 115 may be disposed on a first insulating layer 11. A second insulating layer 12 may be disposed on the fourth semiconductor layer 115. The fourth gate electrode 125 may be disposed on the second insulating layer 12. The fourth gate electrode 125 may overlap the fourth semiconductor layer 115. For example, the fourth gate electrode 125 may overlap the fourth semiconductor layer 115 while the second insulating layer 12 is interposed therebetween. The source and drain electrodes 14*a* and 14*b* may be disposed on a third insulating layer 135. The source and drain electrodes 14*a* and 14*b* may be in contact with the fourth semiconductor layer 115. The fourth transistor T4 may include a P-type MOS thin-film transistor (P-MOSFET) or a low-temperature polycrystalline silicon (LTPS) thin-film transistor. However, embodiments of the present disclosure are not limited thereto.

According to one embodiment, the sixth transistor T6 may have the sixth semiconductor layer 215, the sixth gate electrode 225, and the source and drain electrodes 24*a* and 24*b* as shown in FIG. 3. Although a case where in the sixth transistor T6, the first electrode is the source electrode and the second electrode is the drain electrode is schematically illustrated, embodiments of the present disclosure are not limited thereto. Alternatively, when the first electrode is the drain electrode, the second electrode may be the source electrode. The sixth semiconductor layer 215 may be disposed on the first insulating layer 11. The sixth gate electrode 225 may be disposed on the second insulating layer 12. The sixth gate electrode 225 may overlap the sixth semiconductor layer 215. For example, the sixth gate electrode 225 may overlap the sixth semiconductor layer 215 while the second insulating layer 12 is interposed therebetween. The source and drain electrodes 24*a* and 24*b* may be disposed on the third insulating layer 135. The source and drain electrodes 24*a* and 24*b* may be in contact with the sixth semiconductor layer 215. The sixth transistor T6 may include an N-type MOS thin-film transistor (N-MOSFET) or an oxide thin-film transistor. However, embodiments of the present disclosure are not limited thereto.

According to one embodiment, each of the fourth semiconductor layer 115 and the sixth semiconductor layer 215 may be an area where a channel is formed when the thin-film transistor (TFT) operates. Each of the fourth semiconductor layer 115 and the sixth semiconductor layer 215 may be made of an oxide semiconductor or may be made of each of various organic semiconductors such as amorphous silicon (a-Si), polycrystalline silicon (poly-Si), low-temperature polycrystalline silicon (LTPS), or pentacene. However, embodiments of the present disclosure are not limited thereto. The fourth semiconductor layer 115 and the sixth semiconductor layer 215 may be disposed on the first insulating layer 11. Each of the fourth semiconductor layer 115 and the sixth semiconductor layer 215 may include the channel area, a source area, and a drain area. The channel area of the fourth semiconductor layer 115 may overlap the fourth gate electrode 125 while the second insulating layer 12 is interposed therebetween and may be disposed between the source and drain electrodes 14*a* and 14*b*. The channel area of the sixth semiconductor layer 215 may overlap the sixth gate electrode 225 while the second insulating layer 12 is interposed therebetween and may be disposed between the source and drain electrodes 24*a* and 24*b*. The source area of the fourth semiconductor layer 115 may be electrically connected to the source electrode 14*a* via a contact hole extending through the second insulating layer 12 and the third insulating layer 135. The source area of the sixth semiconductor layer 215 may be electrically connected to the source electrode 24*a* via a contact hole extending through the second insulating layer 12 and the third insulating layer 135. The drain area of the fourth semiconductor layer 115 may be electrically connected to the drain electrode 14*b* through a contact hole extending through the second insulating layer 12 and the third insulating layer 135. The drain area of the sixth semiconductor layer 215 may be electrically connected to the drain electrode 24*b* through a contact hole extending through the second insulating layer 12 and the third insulating layer 135. A buffer layer 105 and the first insulating layer 11 may be disposed between each of the fourth semiconductor layer 115 and the sixth semiconductor layer 215 and the substrate 101. The buffer layer 105 may delay the diffusion of moisture and/or oxygen that has penetrated into the substrate 101. The first insulating layer 11 protects the fourth semiconductor layer 115 and the sixth semiconductor layer 215 and may block various types of defects introduced from the substrate 101.

According to one embodiment, the uppermost layer of the buffer layer 105 in contact with the first insulating layer 11 may be made of a material having different etching characteristics from those of each of the remaining layers of the buffer layer 105, the first insulating layer 11, the second insulating layer 12 and the third insulating layer 135. However, embodiments of the present disclosure are not limited thereto. The uppermost layer of the buffer layer 105 contacting the first insulating layer 11 may be made of one of silicon nitride (SiNx) and silicon oxide (SiOx). However, embodiments of the present disclosure are not limited thereto. Each of the remaining layers of the buffer layer 105, the first insulating layer 11, the second insulating layer 12, and the third insulating layer 135 may be made of the other of silicon nitride (SiNx) and silicon oxide (SiOx). However, embodiments of the present disclosure are not limited thereto. For example, the uppermost layer of the buffer layer 105 in contact with the first insulating layer 11 may be made of silicon nitride (SiNx), while each of the remaining layers of the buffer layer 105, the first insulating layer 11, the second insulating layer 12, and the third insulating layer 135 may be made of silicon oxide (SiOx). However, embodiments of the present disclosure are not limited thereto.

According to one embodiment, the fourth gate electrode 125 and the sixth gate electrode 225 may be formed on the second insulating layer 12. The fourth gate electrode 125 and the sixth gate electrode 225 may respectively overlap the channel areas of the fourth semiconductor layer 115 and the sixth semiconductor layer 215 while the second insulating layer 12 is interposed therebetween. Each of the fourth gate electrode 125 and the sixth gate electrode 225 may be made of a first conductive material and may be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. However, embodiments of the present disclosure are not limited thereto.

According to one embodiment, the source electrode 14*a* may be connected to the exposed source area of the fourth semiconductor layer 115 via the contact hole extending through the second insulating layer 12 and the third insulating layer 135. The source electrode 24*a* may be connected to the exposed source area of the sixth semiconductor layer 215 via the contact hole extending through the second insulating layer 12 and the third insulating layer 135. The drain electrode 14*b* may be opposite to the source electrode 14*a* and may be connected to the drain area of the fourth semiconductor layer 115 via the contact hole extending through the second insulating layer 12 and the third insulating layer 135. The drain electrode 24*b* may be opposite to the source electrode 24*a* and may be connected to the drain area of the sixth semiconductor layer 215 via the contact hole extending through the second insulating layer 12 and the third insulating layer 135. Each of the source and drain electrodes 14*a* and 24*a* and 14*b* and 24*b* may be made of a second conductive material and may be embodied as a single layer or multi-layers made of molybdenum (Mo), aluminum (Al), chromium (Cr), gold (Au), titanium (Ti), nickel (Ni), neodymium (Nd), copper (Cu), or an alloy thereof. However, embodiments of the present disclosure are not limited thereto.

According to one embodiment, a connection electrode 155 may be disposed between a first middle layer 15 and a second middle layer 16. The connection electrode 155 may be connected to each of the drain electrodes 14*b* and 24*b* via a connection electrode contact hole 156 extending through a protective film 145 and the first middle layer 15. The connection electrode 155 may be made of a material having low resistivity and identical to or similar to that of each of the drain electrodes 14*b* and 24*b*. However, embodiments of the present disclosure are not limited thereto.

Referring to FIG. 3, the light-emitting element EL including the light-emitting layer 172 may be disposed on the second middle layer 16 and a bank layer 165. The light-emitting element EL may include an organic electroluminescent diode. However, embodiments of the present disclosure are not limited thereto. For example, the light-emitting element EL may include an inorganic light-emitting element, a quantum dot element, a micro-LED element, or a mini-LED element. However, embodiments of the present disclosure are not limited thereto. In the light-emitting element EL, the first electrode may be an anode electrode, and the second electrode may be a cathode electrode.

According to one embodiment, the light-emitting element EL may include an anode electrode 171, at least one light-emitting layer 172 formed on the anode electrode 171, and a cathode electrode 173 formed on the light-emitting layer 172.

According to one embodiment, the anode electrode 171 may be electrically connected to an exposed portion of the connection electrode 155 disposed on the first middle layer 15 and facing the second middle layer 16 via a contact hole extending through the second middle layer 16.

According to one embodiment, the anode electrode 171 of each pixel may not be covered with the bank layer 165 so as to be exposed. The bank layer 165 may be made of an opaque material (e.g., black) to prevent or at least reduce light interference between adjacent pixels. In this case, the bank layer 165 may include a light-shielding material including at least one of color pigment, organic black, and carbon black. However, embodiments of the present disclosure are not limited thereto. The bank layer 165 may be made of a material including a black pigment, or an organic material such as a benzocyclobutene resin, a polyimide resin, an acryl resin, or a photosensitive polymer. However, embodiments of the present disclosure are not limited thereto. When the bank layer 165 is made of a material including a black pigment or a black dye, the bank layer may be a black bank layer. When the bank layer 165 is made of a material including a black pigment or a black dye, the bank layer may block light from the outside or light reflected from the outside, so that the luminance of the display device may be further improved. A spacer may be further disposed on the bank layer 165. The spacer may be made of the same material as that of the bank layer 165. However, embodiments of the present disclosure are not limited thereto.

Referring to FIG. 3, the at least one light-emitting layer 172 may be formed on a portion of the anode electrode 171 corresponding to a light-emitting area defined by the bank layer 165. The at least one light-emitting layer 172 may include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer may be based on a light-emitting direction. However, embodiments of the present disclosure are not limited thereto. In addition, the light-emitting layer 172 may include first and second light-emitting stacks facing each other while a charge generating layer is interposed therebetween. In this case, the light-emitting layer 172 of one of the first and second light-emitting stacks may generate blue light, while the light-emitting layer 172 of the other of the first and second light-emitting stacks may generate yellow-green light, so that white light may be generated from a combination of the first and second light-emitting stacks. However, embodiments of the present disclosure are not limited thereto. The white light generated from the combination of the first and second light-emitting stacks may be incident on a color filter positioned above or below the light-emitting layer 172, such that a color image may be realized. In another example, each light-emitting layer 172 may generate each color light corresponding to each pixel without a separate color filter such that a color image may be rendered. For example, the light-emitting layer 172 of a red (R) pixel emits red light, the light-emitting layer 172 of a green (G) pixel emits green light, and the light-emitting layer 172 of a blue (B) pixel emits blue light.

Referring to FIG. 3, the cathode electrode 173 may be formed to face the anode electrode 171 while the light-emitting layer 172 is disposed therebetween and may receive the high-potential driving voltage EVDD.

According to one embodiment, an encapsulation stack or encapsulation layer 18 may block penetration of external moisture or oxygen into the light-emitting element EL that is vulnerable to external moisture or oxygen. To this end, the encapsulation layer 18 may include at least one inorganic encapsulation layer and at least one organic encapsulation layer. However, embodiments of the present disclosure are not limited thereto. In the present disclosure, a structure of the encapsulation layer 18 in which a first encapsulation layer 181, a second encapsulation layer 182, and a third encapsulation layer 183 are sequentially stacked is described by way of example. However, embodiments of the present disclosure are not limited thereto.

According to one embodiment, the first encapsulation layer 181 may be formed on the substrate 101 on which the cathode electrode 173 has been formed. The third encapsulation layer 183 may be formed on the substrate 101 on which the second encapsulation layer 182 has been formed. The third encapsulation layer 183 and the first encapsulation layer 181 may surround a top face, a bottom face and a side face of the second encapsulation layer 182. The first encapsulation layer 181 and the third encapsulation layer 183 may minimize or prevent penetration of external moisture or oxygen into the light-emitting element EL. Each of the first encapsulation layer 181 and the third encapsulation layer 183 may be made of an inorganic insulating material that may be deposited at a low temperature, such as silicon nitride (SiNx), silicon oxide (SiOx), silicon oxynitride (SiON), or aluminum oxide (Al2O3). However, embodiments of the present disclosure are not limited thereto. Each of the first encapsulation layer 181 and the third encapsulation layer 183 is deposited in a low temperature atmosphere. Thus, during a deposition process of the first encapsulation layer 181 and the third encapsulation layer 183, the light-emitting element EL which is vulnerable to a high-temperature atmosphere may be prevented from being damaged.

According to one embodiment, the second encapsulation layer 182 serves as a shock-absorbing layer to relieve a stress between layers due to bending of the display device 100 and may planarize a step between layers. The second encapsulation layer 182 may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. However, embodiments of the present disclosure are not limited thereto. When the second encapsulation layer 182 is formed using an inkjet method, a dam DAM may be disposed to prevent the second encapsulation layer 182 in a liquid state from spreading to an edge of the substrate 101. The dam DAM may be closer to the edge of the substrate 101 than the second encapsulation layer 182 may be. The dam DAM may prevent the second encapsulation layer 182 in the liquid state from spreading to a pad area where a conductive pad disposed at the outermost side of the substrate 101 is disposed.

According to one embodiment, the dam DAM is designed to prevent or at least reduce diffusion of the second encapsulation layer 182. However, when the second encapsulation layer 182 overflows the dam DAM during a process, the second encapsulation layer 182 as an organic layer may be exposed to an outside, so that moisture or the like may invade the light-emitting element. Therefore, to prevent the invasion, at least two dams DAM may be stacked. However, embodiments of the present disclosure are not limited thereto.

Referring to FIG. 3, the dam DAM may be disposed on the protective film 145 and in the non-display area NA.

Further, the dam DAM, and the first middle layer 15 and the second middle layer 16 may be formed simultaneously. However, embodiments of the present disclosure are not limited thereto. The first middle layer 15, and a lower layer of the dam DAM may be formed simultaneously. The second middle layer 16, and an upper layer of the dam DAM may be formed simultaneously. Thus, the dam DAM may have a double layer structure. However, embodiments of the present disclosure are not limited thereto.

Accordingly, the dam DAM may be made of the same material as that of each of the first middle layer 15 and the second middle layer 16. However, embodiments of the present disclosure are not limited thereto.

Referring to FIG. 3, the dam DAM may overlap the low-potential driving power line VSS. For example, the low-potential driving power line VSS may be formed in a layer under the dam DAM and in the non-display area NA.

According to one embodiment, the low-potential driving power line VSS and a gate driver 30 in a form of a gate in panel (GIP) may surround a periphery of the display panel. The low-potential driving power line VSS may be located outwardly of the gate driver 30. Further, the low-potential driving power line VSS may be connected to the anode electrode 171 to apply a common voltage thereto. The gate driver 30 is simply illustrated in plan and cross-sectional views. However, the gate driver 30 may be configured using a thin-film transistor (TFT) having the same structure as that of the thin-film transistor (TFT) of the display area AA. However, embodiments of the present disclosure are not limited thereto.

Referring to FIG. 3, the low-potential driving power line VSS may be disposed outwardly of the gate driver 30. The low-potential driving power line VSS may be disposed outwardly of the gate driver 30 and may surround the display area AA. The low-potential driving power line VSS may be made of the same material as that of each of the source and drain electrodes 14*a* and 24*a* and 14*b* and 24*b* of the fourth and sixth thin-film transistors T4 and T6. However, embodiments of the present disclosure are not limited thereto. For example, the low-potential driving power line VSS may be made of the same material as that of each of the fourth gate electrode 125 and the sixth gate electrode 225. However, embodiments of the present disclosure are not limited thereto.

Further, the low-potential driving power line VSS may be electrically connected to the anode electrode 171. Alternatively, the low-potential driving power line VSS may be electrically connected to the cathode electrode 173. The low-potential driving power line VSS may supply the low-potential driving voltage EVSS to the plurality of pixels in the display area AA.

According to one embodiment, a touch layer 19 may be disposed on the encapsulation layer 18. In the touch layer 19, a buffer film 191 may be positioned between a touch sensor metal including touch connection electrodes 192 and 194 and touch electrodes 195 and 196 and the cathode electrode 173 of the light-emitting element EL.

According to one embodiment, the buffer film 191 may prevent chemical (developer, etchant, etc.) used in a manufacturing process of the touch sensor metal disposed on the buffer film 191 or moisture from the outside from invading the light-emitting layer 172 including an organic material. Accordingly, the buffer film 191 may prevent damage to the light-emitting layer 172 as vulnerable to the chemicals or moisture.

According to one embodiment, the buffer film 191 may be made of an organic insulating material that may be formed at a low temperature below or equal to a certain temperature (100 degrees Celsius) to prevent damage to the light-emitting layer 172 including the organic material vulnerable to a high temperature, and that has a low dielectric constant of 1 to 3. However, embodiments of the present disclosure are not limited thereto. For example, the buffer film 191 may be made of an acryl-based, epoxy-based, or siloxane-based material. However, embodiments of the present disclosure are not limited thereto. The buffer film 191 made of the organic insulating material and having planarization performance may prevent damage to the encapsulation layer 18 and fracture of the touch sensor metal formed on the buffer film 191 due to bending of the display device.

According to one embodiment, based on a mutual-capacitance-based touch sensor structure, the touch electrodes 195 and 196 may be disposed on the buffer film 191, and the touch electrodes 195 and 196 may be disposed to intersect each other. However, embodiments of the present disclosure are not limited thereto.

According to one embodiment, the touch connection electrodes 192 and 194 may electrically connect the touch electrodes 195 and 196 to each other. The touch connection electrodes 192 and 194 and the touch electrodes 195 and 196 may be positioned on different layers while the touch insulating film 193 is interposed therebetween. However, embodiments of the present disclosure are not limited thereto.

According to one embodiment, the touch connection electrodes 192 and 194 may overlap the bank layer 165, thereby preventing an aperture ratio of the display device from being lowered.

According to one embodiment, a portion of the touch connection electrode 192 may extend along upper and side surfaces of the encapsulation layer 18 and upper and side surfaces of the dam DAM and then may be electrically connected to a touch driver circuit (not shown) via a touch pad 198. Thus, the touch electrodes 195 and 196 may be electrically connected to the touch driver circuit.

According to one embodiment, the portion of the touch connection electrode 192 may receive a touch driving signal from the touch driver circuit and transmit the same to the touch electrodes 195 and 196 and may receive a touch sensing signal from the touch electrodes 195 and 196 and may transmit the same to the touch driver circuit.

According to one embodiment, a protective film 197 may be disposed on the touch electrodes 195 and 196. In the drawing, it is shown that the protective film 197 is disposed only on the touch electrodes 195 and 196. However, embodiments of the present disclosure are not limited thereto. The protective film 197 may extend to an inner end or an outer end of the dam DAM and thus may also be disposed on the touch connection electrode 192.

Further, a color filter (not shown) may be further disposed on the encapsulation layer 18, and the color filter may be positioned on the touch layer 19 or between the encapsulation layer 18 and the touch layer 19. However, embodiments of the present disclosure are not limited thereto.

In FIG. 3, the display area AA of the display device 100 may be configured as follows. The buffer layer 105 may be disposed on the substrate 101 including the display area AA and the non-display area NA. The first insulating layer 11 may be disposed on the buffer layer 105. The fourth semiconductor layer 115 of the fourth transistor T4 and the sixth semiconductor layer 215 of the sixth transistor T6 may be disposed on the first insulating layer 11. The second insulating layer 12 may be disposed on the first insulating layer 11, the fourth semiconductor layer 115, and the sixth semiconductor layer 215.

According to one embodiment, the low-potential driving power line VSS, the fourth gate electrode 125 of the fourth transistor T4, and the sixth gate electrode 225 of the sixth transistor T6 may be disposed on the second insulating layer 12. The third insulating layer 135 may be disposed on the second insulating layer 12, the low-potential driving power line VSS, the fourth gate electrode 125, and the sixth gate electrode 225. Both the fourth gate electrode 125 and the sixth gate electrode 225 may be in contact with a light-emitting signal line.

According to one embodiment, the first electrode 14*a* and the second electrode 14*b* of the fourth transistor T4 and the first electrode 24*a* and the second electrode 24*b* of the sixth transistor T6 may be disposed on the third insulating layer 135. Each of the first electrode 14*a* and the second electrode 14*b* of the fourth transistor T4 may be in contact with the fourth semiconductor layer 115 via the first contact hole, while each of the first electrode 24*a* and the second electrode 24*b* of the sixth transistor T6 may be in contact with the sixth semiconductor layer 215 via the second contact hole. The protective film 145 may be disposed on the third insulating layer 135, the first electrode 14*a* and the second electrode 14*b* of the fourth transistor T4, and the first electrode 24*a* and the second electrode 24*b* of the sixth transistor T6.

According to one embodiment, the first middle layer 15 may be disposed on the protective film 145 and in the display area AA. The connection electrode 155 may be disposed on the first middle layer 15 and in the display area AA. The connection electrode 155 may be in contact with the first electrode 14*a* or the second electrode 14*b* of the fourth transistor T4 via the connection electrode contact hole (a third contact hole) 156 and may be in contact with the first electrode 24*a* or the second electrode 24*b* of the sixth transistor T6 via the further connection electrode contact hole (a third contact hole) 156. The first electrode 14*a* or the second electrode 14*b* of the fourth transistor T4 that is not connected to the connection electrode 155 may be in contact with the driving transistor. The first electrode 24*a* or the second electrode 24*b* of the sixth transistor T6 that is not connected to the connection electrode 155 may be in contact with the reset voltage line. The second middle layer 16 may be disposed on the first middle layer 15 and the connection electrode 155 and in the display area AA.

According to one embodiment, the first electrode 171 of the light-emitting element EL may be disposed on the second middle layer 16 and in the display area AA. The first electrode 171 of the light-emitting element EL may be in contact with the connection electrode 155 via a fourth contact hole. The bank layer 165 may be disposed on the second middle layer 16 except for the first electrode 171 of the light-emitting element EL and in the display area AA. The light-emitting layer 172 may be disposed on the bank layer 165 and the first electrode 171 of the light-emitting element EL and in the display area AA. The second electrode 173 of the light-emitting element EL may be disposed on the light-emitting layer 172 and in the display area AA. The encapsulation stack or encapsulation layer 18 may be disposed on the second electrode 173 of the light-emitting element EL and in the display area AA and on the protective film 145 in the non-display area NA.

Figure 4A:
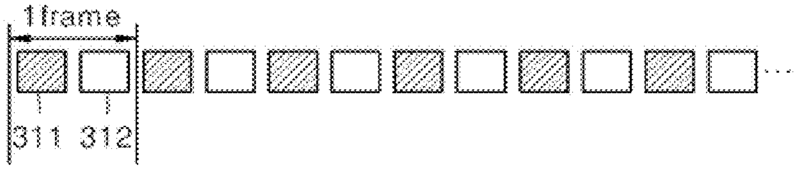
FIGS. 4A, 4B, and 4C are example diagrams showing a frame based on an operation frequency according to one embodiment of the present disclosure.
Figure 4B:
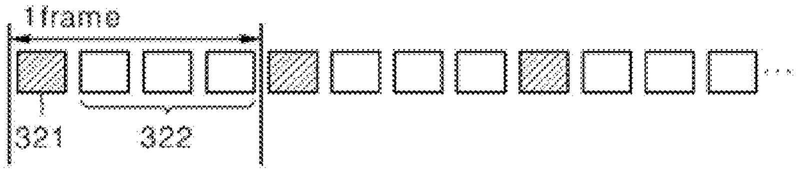
Figure 4C:
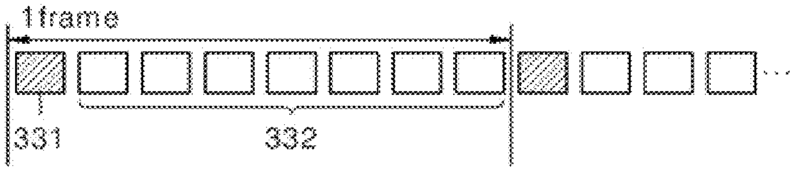
Figure 5:
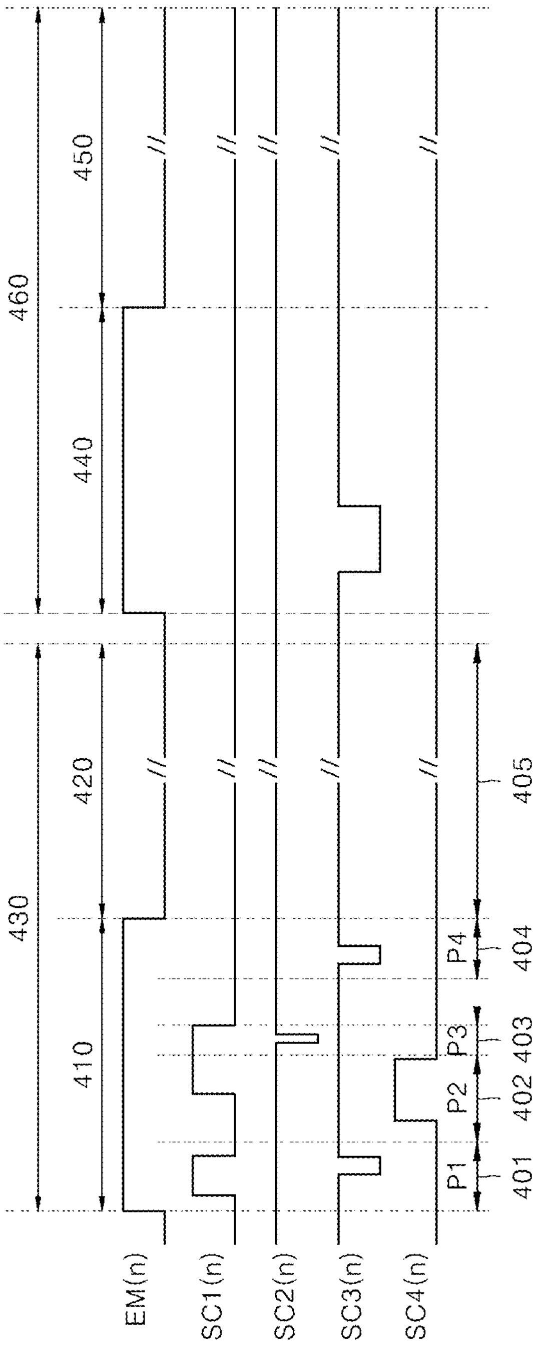
FIG. 5 is an example diagram showing an operation timing including a data scan period and a bias scan period of a pixel circuit according to an embodiment of the present disclosure.

FIGS. 4A, 4B, and 4C are example diagrams showing a frame based on an operation frequency according to an embodiment of the present disclosure. FIG. 5 is an example diagram showing an operation timing including a data scan period and a bias scan period of a pixel circuit according to an embodiment of the present disclosure.

FIG. 4A is an example diagram showing a case where the display panel 110 according to an embodiment of the present disclosure operates at 120 Hz. FIG. 4B is an example diagram showing a case where the display panel 110 according to an embodiment of the present disclosure operates at 60 Hz. FIG. 4C is an example diagram showing a case where the display panel 110 according to an embodiment of the present disclosure operates at 30 Hz.

Referring to FIGS. 4A, 4B, and 4C, when the display panel 110 operates at 120 Hz (FIG. 4A), each of a data scan period 311 and a bias scan period 312 may occur one time for one frame. However, embodiments of the present disclosure are not limited thereto. In another example, when the display panel 110 operates at 60 Hz (FIG. 4B), the data scan period 321 may occur one time for one frame, and the bias scan period 322 may occur three times for one frame. However, embodiments of the present disclosure are not limited thereto. In still another example, when the display panel 110 operates at 30 Hz (FIG. 4C), the data scan period 331 may occur one time for one frame, and the bias scan period 332 may occur 7 times for one frame. However, embodiments of the present disclosure are not limited thereto.

For example, when the display panel 110 operates at 10 Hz, the data scan period may occur one time for one frame and the bias scan period may occur 23 times for one frame. However, embodiments of the present disclosure are not limited thereto. In still another example, when the display panel 110 operates at 1 Hz, the data scan period may occur one time for one frame and the bias scan period may occur 239 times for one frame. However, embodiments of the present disclosure are not limited thereto.

As described above, when the display panel 110 operates at an increasingly lower frequency, the data scan period may occur one time for one frame, while the number of bias scan periods occurring for one frame may increase. However, embodiments of the present disclosure are not limited thereto.

Referring to FIG. 5, each of a data scan period 430 and a bias scan period 460 of the pixel circuit may include non-light-emission periods 410 and 440 and light-emission periods 420 and 450. However, embodiments of the present disclosure are not limited thereto. The non-light-emission period 410 of the data scan period 430 may include four periods 401, 402, 403, and 404. However, embodiments of the present disclosure are not limited thereto.

The first period 401 of the periods may be the off-bias period for minimizing the difference between the characteristics of the gate node of the driving transistor for different frames. The second period 402 may be the initialization period to resolve the hysteresis of the driving transistor and initialize the gate node of the driving transistor. The third period 403 may be a sampling period for writing the data voltage to the gate node of the driving transistor. The fourth period 404 may be the on bias period for balancing the voltage of the data scan period and the voltage of the bias scan period with each other.

The display device according to an embodiment of the present disclosure may operate in a VRR (variable refresh rate) mode. However, embodiments of the present disclosure are not limited thereto. In the VRR mode, the display device operates at a constant frequency. However, when a high-speed operation is required, a refresh rate at which the data voltage Vdata is updated increases. Thus, the pixel operates at the increased refresh rate. When low power consumption or a low-speed operation is required, the refresh rate is lowered such that the pixel operates at the lowered refresh rate. However, embodiments of the present disclosure are not limited thereto.

According to one embodiment, each of the plurality of pixels P may operate based on a combination of a refresh frame and a hold frame within 1 second. However, embodiments of the present disclosure are not limited thereto. In the present disclosure, one set is defined as a combination of a refresh frame in which the data voltage Vdata is updated and a hold frame in which the data voltage Vdata is not updated for 1 second. The combination of the refresh frame and the hold frame is repeated on a one set period basis.

When the device operates at a refresh rate of 120 Hz, only the refresh frame may be repeated. That is, the refresh frame may be repeated 120 times within 1 second. One refresh frame period is 1/120=8.33 ms, and one set period is also 8.33 ms.

When the refresh rate is 60 Hz, the refresh frame and the hold frame may be repeated alternately with each other. That is, the refresh frame and the hold frame may be alternately repeated with each other, such that each of the refresh frame and the hold frame may be repeated 60 times within 1 second. Thus, each of one refresh frame period and one hold frame period is 0.5/60=8.33 ms, and one set period is 16.66 ms.

When the refresh rate is 1 Hz, one frame may be composed of one refresh frame, and 119 hold frames subsequent to the one refresh frame. Furthermore, when the refresh rate is 1 Hz, one frame may be composed of a plurality of refresh frames and a plurality of hold frames. In this regard, a period of each of one refresh frame and one hold frame is 1/120=8.33 ms, and one set period is 1 s.

In the refresh frame, a new data voltage Vdata is charged to apply the new data voltage Vdata to the driving transistor DT. In the hold frame, the data voltage Vdata of a previous frame is maintained. In this regard, the hold frame may be referred to as a skip period in the sense that a process of applying the new data voltage Vdata to the driving transistor DT is omitted in the hold frame.

Each of the plurality of pixels P may initialize the charged or remaining voltage within the pixel circuit during the refresh frame. Specifically, each of the plurality of pixels P may remove the influence of the data voltage Vdata and the high potential driving voltage EVDD stored in a previous frame during the refresh frame. Accordingly, each of the plurality of pixels P may display an image corresponding to the new data voltage Vdata in the hold frame.

Each of the plurality of pixels P may display an image by providing the driving current corresponding to the data voltage Vdata to the light-emission element EL during the hold frame, and may maintain the turned-on state of the light-emission element EL.

The pixel circuit may operate such that the refresh frame includes at least one bias period 401 and 404, the initialization period 402, the sampling period 403, and the light-emission period 405. However, this is only an example, and an embodiment of the present disclosure is not necessarily limited thereto.

The pixel circuit may operate such that the refresh frame includes at least one bias period 401 and 404.

According to one embodiment, the at least one bias period 401 and 404 is a period for which an on-bias stress operation OBS in which the bias voltage Vobs is applied is performed. For the bias period, the light-emission control signal EM (n) may be at a high voltage, and the third and fourth transistors T3 and T4 may be turned off. The first scan signal SC1(*n*) and the fourth scan signal SC4(*n*) may be at a low voltage, and the first transistor T1 and the seventh transistor T7 may be turned off. The second scan signal SC2(*n*) may be at a high voltage, and the second transistor T2 may be turned off.

According to one embodiment, the third scan signal SC3(*n*) of a low voltage may be input, and the fifth and sixth transistors T5 and T6 may be turned on. As the fifth transistor T5 is turned on, the bias voltage Vobs may be applied to the first electrode of the driving transistor DT connected to the second node N2.

In this regard, the bias voltage Vobs may be supplied to the third node N3 as the drain electrode of the driving transistor DT, thereby reducing a charging time or charging delay of the voltage of the fifth node N5 as the anode electrode of the light-emission element EL for the light-emission period. The driving transistor DT may be maintained at a stronger saturation state.

For example, as the bias voltage Vobs increases, the voltage of the third node N3 as the drain electrode of the driving transistor DT may increase, and the gate-source voltage or the drain-source voltage of the driving transistor DT may decrease. Therefore, the bias voltage Vobs may be at least greater than the data voltage Vdata.

In this regard, a magnitude of the drain-source current Id flowing through the driving transistor DT may be reduced, and a stress of the driving transistor DT may be reduced in a positive bias stress situation, thereby resolving the charging delay of the voltage of the third node N3. Furthermore, a hysteresis of the driving transistor DT may be alleviated by performing an on-bias stress operation thereon before sampling the threshold voltage Vth of the driving transistor DT.

Accordingly, in the at least one bias period 401 and 402, the on bias stress operation OBS may be defined as an operation of directly applying an appropriate bias voltage to the driving transistor DT during non-emission periods.

Furthermore, as the sixth transistor T6 may be turned on in at least one bias period 401 and 402, the anode electrode (or the pixel electrode) of the light-emitting element EL connected to the fifth node N5 may be initialized with the first initialization voltage Var.

The fifth and sixth transistors T5 and T6 may be configured such that the gate electrodes thereof receive separate scan signals and thus are independently controlled. That is, it is not necessarily required to simultaneously apply the bias voltage to the first electrode of the driving transistor DT and the anode electrode of the light-emitting element EL for the bias period.

Referring to FIG. 5, the pixel circuit may operate such that the initialization period 402 is included in the refresh frame. The initialization period 402 refers to a period for which the voltage of the gate electrode of the driving transistor DT is initialized.

For the initialization period 402, each of the first scan signal SC1(*n*), the fourth scan signal SC4(*n*), and the light-emission control signal EM (n) may be at a high voltage and the first transistor T1 and the seventh transistor T7 may be turned on. The second to sixth transistors T2, T3, T4, T5, and T6 may be turned-off. As the first and seventh transistors T1 and T7 are turned on, the gate electrode of the driving transistor DT connected to the first node N1 and the drain electrode of the driving transistor DT connected to the third node N3 may be initialized with the initialization voltage Vini.

Referring to FIG. 5, the pixel circuit may operate such that the sampling period 403 is included in the refresh frame. The sampling period refers to a period for which the threshold voltage Vth of the driving transistor DT is sampled.

For the sampling period 403, each of the first scan signal SC1(*n*), the third scan signal SC3(*n*), and the light-emission control signal EM (n) may be at a high voltage, and each of the second scan signal SC2(*n*) and the fourth scan signal SC4(*n*) may be at a low voltage. Accordingly, the third to seventh transistors T3, T4, T5, T6, and T7 may be turned off, the first transistor T1 may be maintained in the turned-on state, and the second transistor T2 may be turned on. That is, the second transistor T2 may be turned on, such that the data voltage Vdata may be applied to the driving transistor DT, and thus, the diode connection between the first node N1 and the third node N3 of the first transistor T1 may be established, such that the threshold voltage Vth of the driving transistor DT may be sampled.

Referring to FIG. 5, the pixel circuit may operate such that the light-emission period 405 is included in the refresh frame. The light-emission period 405 refers to a period for which the light-emitting element EL emits light under the driving current corresponding to the sampled data voltage Vdata.

In the light-emission period 405, the light-emission control signal EM (n) may be at a low voltage, and the third and fourth transistors T3 and T4 may be turned on.

As the third transistor T3 is turned on, the high potential driving voltage EVDD connected to the fourth node N4 may be applied to the first electrode of the driving transistor DT connected to the second node N2 via the third transistor T3. The driving current Id supplied from the driving transistor DT to the light-emitting element EL via the fourth transistor T4 may be independent of the value of the threshold voltage Vth of the driving transistor DT. Thus, the threshold voltage Vth of the driving transistor DT may be compensated for.

Referring to FIG. 5, the hysteresis characteristics of the driving transistor change depending on the timing of each of the first period 401 and the second period 402, such that the change in the threshold voltage Vth due to the hysteresis may cause deviation in the response characteristics. In order to improve the response characteristics, the hysteresis of the driving transistor should be eliminated (or controlled) by applying a significant level of the on bias for the first period 401 and the second period 402 before the third period 403.

However, when the on bias is increased for the first period 401 and the second period 402, the balance between the threshold voltage for the data scan period and the threshold voltage for the bias period may be damaged. Thus, when the display panel 110 operates at a low frequency, the flickering may occur due to the fluctuation of the luminance within the frame. Therefore, the current operation timing may not satisfy both the response characteristics and the flicker characteristics.

Hereinafter, a driving method for satisfying both the response characteristics of the driving transistor and the flicker characteristics when the display panel 110 operates at a low frequency, for example, in the AoD (Always on Display) mode is described.

Figure 6:
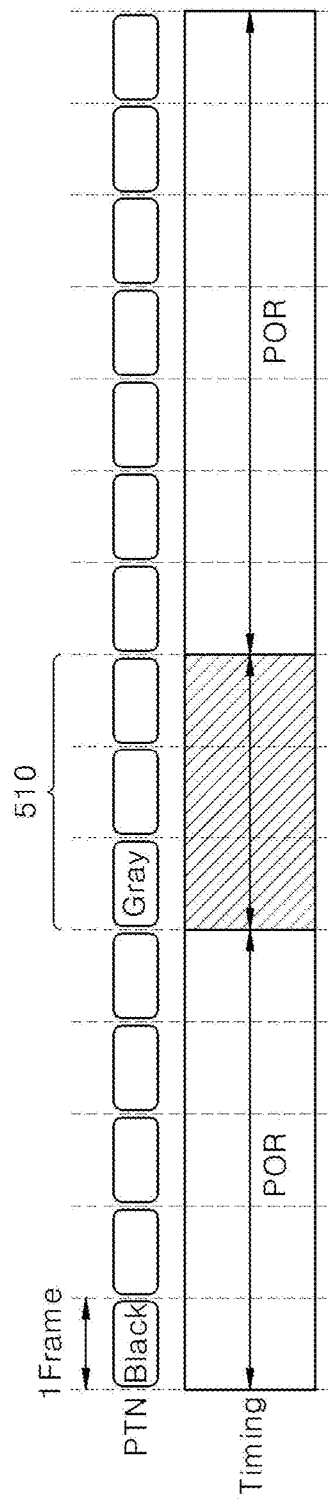
FIG. 6 is an example diagram showing an example in which an on-bias added frame is inserted while the display panel operates in an AoD mode in which the display panel operates at a low frequency according to an embodiment of the present disclosure.
Figure 7:
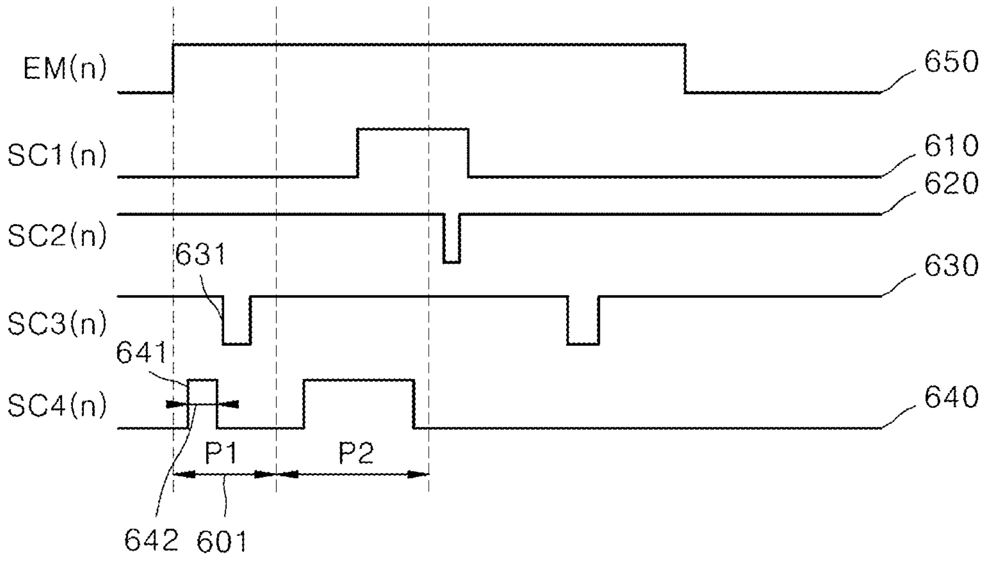
FIG. 7 is an example diagram showing an operation timing in which a first period is modified for a non-light-emission period of a data scan period according to an embodiment of the present disclosure.
Figure 8:
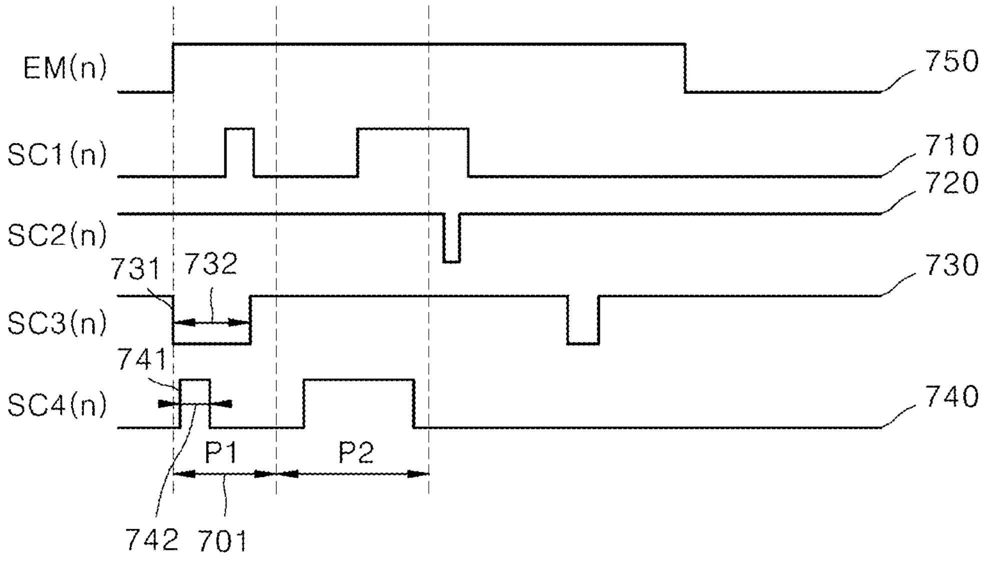
FIG. 8 is an example diagram showing an operation timing in which the first period is modified for the non-light-emission period of the data scan period according to another embodiment of the present disclosure.
Figure 9:
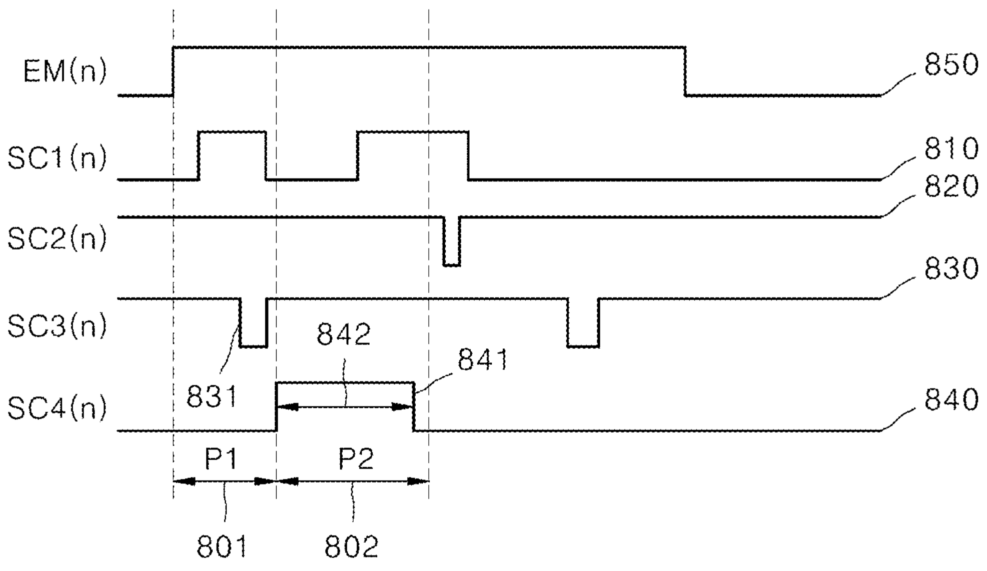
FIG. 9 is an example diagram showing an operation timing in which a second period is modified for the non-light-emission period of the data scan period according to one embodiment of the present disclosure.

FIG. 6 is an example diagram showing an example in which the on-bias added frame is inserted while the display panel operates in the AoD mode in which the display panel operates at a low frequency according to an embodiment of the present disclosure. FIG. 7 is an example diagram showing an operation timing in which the first period is modified for a non-light-emission period of the data scan period according to an embodiment of the present disclosure. FIG. 8 is an example diagram showing an operation timing in which the first period is modified for the non-light-emission period of the data scan period according to another embodiment of the present disclosure. FIG. 9 is an example diagram showing an operation timing in which the second period is modified for the non-light-emission period of the data scan period according to one embodiment of the present disclosure.

Referring to FIG. 6, in order to satisfy (or control) both the response characteristics of the driving transistor and the flicker characteristics having the trade-off relationship with each other, the display device 100 according to one embodiment of the present disclosure may be configured to insert a timing of the on-bias into each of a plurality of gray frames for a reference time, for example, a POR (Power on Reset) timing optimized for the initial flicker characteristic of the gray frame, after the frame of the display panel 110 has switched from the black frame to the gray frame. For example, a POR frame may have a refresh rate of 1 Hz, and the frame into which the on-bias is inserted (or the on-bias added frame) may have a refresh rate of 10 Hz. The POR frame after the on-bias added frame may have a refresh rate of 1 Hz.

According to one embodiment, when the display panel 110 has switched from the black frames (e.g., 5 frames) to the gray frames (e.g., 10 frames), the hysteresis of the driving transistor may occur. For this reason, the display device 100 (e.g., the timing controller 120) of the present disclosure may be configured to generate and output a scan signal having an adjusted pulse width for each of a plurality of gray frames 510 (e.g., 3 gray frames) after the black frames (e.g., 5 black frames) in order to satisfy both the response characteristics of the driving transistor and the flicker characteristics.

Alternatively, the timing controller 120 may be configured to transmit a control signal to the gate driver 130 to generate a scan signal having an adjusted pulse width for each of a plurality of gray frames 510 (e.g., three gray frames) so that the gate driver 130 may output a scan signal having the adjusted pulse width for each of the plurality of gray frames 510 (e.g., three gray frames) following the black frames (e.g., five black frames).

Referring to FIG. 7, the gate driver 130 according to one embodiment may output a first scan signal 610, a second scan signal 620, a third scan signal 630, a fourth scan signal 640, and a light-emission control signal 650 to the display panel 110 under the control of the timing controller 120.

According to one embodiment, the timing controller 120 may be configured to transmit a control signal for controlling an output of the fourth scan signal 640 having an adjusted pulse width for the first period 601 to the gate driver 130. The gate driver 130 may output the fourth scan signal 640 having an adjusted pulse width 642 for the first period 601 based on the control signal.

According to one embodiment, the timing controller 120 may control an output of output the fourth scan signal 640 having an adjusted pulse width 642 (in this regard, the adjustment refers to changing an off bias to an on bias) for the first period 601 to the gate driver 130 which in turn may apply the fourth scan signal 640 having a pulse (on bias) 641 added thereto to the gate electrode of the driving transistor DT.

According to one embodiment, the timing controller 120 may control the gate driver 130 so that the fourth scan signal 640 including the pulse 641 of the first period 601 is output before the third scan signal 630 is turned on through a pulse 631. For example, the third scan signal 630 may be turned on through the pulse 631 at a time when the fourth scan signal 640 has been turned off for the first period 601. For example, a width of the pulse 631 of the third scan signal may be equal to the width 642 of the pulse 641 of the fourth scan signal for the first period 601.

As described above, the timing controller 120 according to the present disclosure may be configured to control the gate driver 130 so that the fourth scan signal 640 having the adjust width 642 of the pulse 641 of the first period 601 is output before the third scan signal 630 is turned on through the pulse 631 for the first period 601, thereby initializing the gate electrode of the driving transistor DT using the second initialization voltage Vini.

Referring to FIG. 8, the gate driver 130 according to one embodiment may output a first scan signal 710, a second scan signal 720, a third scan signal 730, a fourth scan signal 740, and a light-emission control signal 750 to the display panel 110 under the control of the timing controller 120.

According to one embodiment, the timing controller 120 may be configured to transmit a control signal for controlling an output of each of the third scan signal 730 having an adjusted pulse width and the fourth scan signal 740 having an adjusted pulse width for the first period 701 to the gate driver 130. The gate driver 130 may output the third scan signal 730 having the adjusted pulse width 732 and the fourth scan signal 740 having the adjusted pulse width 742 for the first period 701, based on the control signal.

According to one embodiment, the timing controller 120 may be configured to control the gate driver 130 to output the third scan signal 730 having the adjusted width 732 of the pulse 731 (in this regard, the adjustment refers to changing the off bias to the on bias) for the first period 701 to turn on the sixth transistor T6. In addition, the timing controller 120 may be configured to control the gate driver 130 to output the fourth scan signal 740 having the adjusted width 742 of the pulse 741 (in this regard, the adjustment refers to changing the off bias to the on bias) for the first period 701 and to apply the fourth scan signal 740 including the bias voltage to the gate electrode of the driving transistor DT. Due to the bias voltage, the driving transistor DT may be initialized.

According to one embodiment, the timing controller 120 may control the gate driver 130 so that for the first period 701, the fourth scan signal 740 having the adjusted width 742 of the pulse 741 is output after the third scan signal 730 is turned on through the pulse 731. Alternatively, for the first period 701, at a time point (the left falling edge of pulse 731) when the third scan signal 730 is turned on, the fourth scan signal 740 having the adjusted width 742 of the pulse 741 may be turned on. For example, for the first period 701, the width 732 of the pulse 731 of the third scan signal may be greater than the width 742 of the pulse 741 of the fourth scan signal.

The timing controller 120 according to the present disclosure may be configured to control the gate driver 130 so that for the first period 701, the fourth scan signal 740 having the adjusted width 742 of the pulse 741 is output after the third scan signal 730 is turned on through the pulse 731, thereby turning on the fifth and sixth transistors T5 and T6. As the fifth transistor T5 is turned on, the bias voltage Vobs may be applied to the first electrode of the driving transistor DT connected to the second node N2.

Referring to FIG. 9, the gate driver 130 according to one embodiment may be configured to output a first scan signal 810, a second scan signal 820, a third scan signal 830, a fourth scan signal 840, and a light-emission control signal 850 to the display panel 110 under the control of the timing controller 120.

According to one embodiment, the timing controller 120 may be configured to transmit a control signal for controlling an output of a fourth scan signal 840 having an adjusted pulse width 842 for a second period 802 to the gate driver 130. The gate driver 130 may be configured to output the fourth scan signal 840 having the adjusted width 842 of the pulse 841 for the second period 802 based on the control signal.

According to one embodiment, the timing controller 120 may be configured to control an output of the fourth scan signal 840 having the adjusted width 842 of the pulse 841 (in this regard, the adjustment refers to increase in an application time of the on-bias for the second period 802) through the gate driver 130 to apply the bias voltage to the gate electrode of the driving transistor DT. That is, the timing controller 120 may be configured to increase an application time of the on-bias for initializing a gate node of the driving transistor.

According to one embodiment, the timing controller 120 may be configured to control the gate driver 130 so that the third scan signal 830 is turned on through the pulse 831 for the first period 801, and then, the fourth scan signal 840 having the adjusted width 842 of the pulse 841 is output for the second period 802. For example, after the third scan signal 830 has been turned on through the pulse 831 for the first period 801, the fourth scan signal 840 may be turned on through the pulse 841 for the second period 802.

Figures 10A, 10B, 10C:
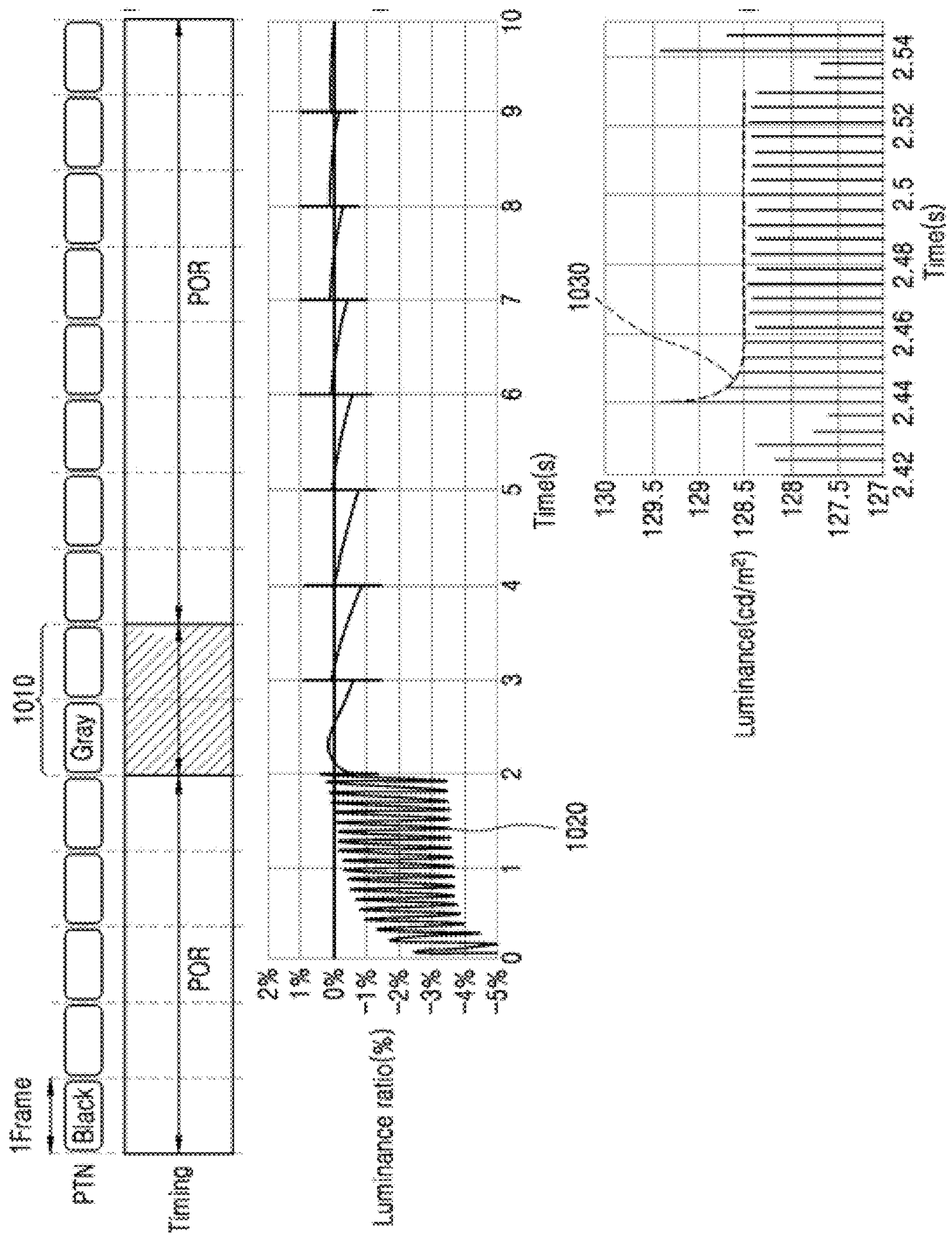
FIGS. 10A, 10B, and 10C are experimental results showing response characteristics and flicker characteristics of a display panel operating under an operation timing according to another embodiment of the present disclosure.

FIGS. 10A, 10B, and 10C are experimental results showing response characteristics and flicker characteristics of a display panel operating under an operation timing according to another embodiment of the present disclosure.

FIG. 10A is an example diagram in which two frames having the on bias added thereto are inserted into the POR timing. FIG. 10B is an experimental result showing response characteristics of the display panel operating under the operation timing according to another embodiment of the present disclosure. FIG. 10C is an experimental result showing flicker characteristics of the display panel operating under the operation timing according to another embodiment of the present disclosure. In FIG. 10B, a horizontal axis may refer to a time (second) and a vertical axis may refer to a luminance ratio (%). In FIG. 10C, a horizontal axis may refer to a time (second) and a vertical axis may refer to a luminance level (cd/m2).

It may be identified that when the display panel operates at a frequency of 10 Hz, based on the operation timing (FIG. 8) according to another embodiment of the present disclosure in which the on-bias timing is inserted into each of two frames 1010 after the POR timing, both the response characteristic 1020 of the driving transistor and the flicker characteristic 1030 for an eighth frame are improved.

The timing controller 120 according to the present disclosure may be configured to control the gate driver 130 so that the fourth scan signal 840 having the adjusted width 842 of the pulse 841 is output for the second period 802 after the third scan signal 830 has been turned on through the pulse 831 for the first period 801, thereby increasing the on-bias application time for removing the hysteresis of the driving transistor DT using the second initialization voltage Vini. In addition, the embodiment of FIG. 9 may also be combined with the embodiment described with respect to FIG. 7 or FIG. 8 to improve both the response characteristics and the flicker characteristics.

In addition, while the display panel 110 is operating in the AoD (Always on Display) mode in which the display panel operates at a low frequency, the timing controller 120 of the display device 100 of the present disclosure may be configured to control the output of the scan signal having the adjusted width of the pulse for the gray frame into which the frame of the display panel has switched from the black frame, thereby may improving both the response characteristics of the driving transistor and the flicker characteristics.

The display device according to various embodiments of the present disclosure may be applied to a mobile device, a video phone, a smart watch, a watch phone, a wearable device, a foldable device, a rollable device, a bendable device, a flexible device, a curved device, a sliding device, a variable device, an electronic notebook, an electronic book, a portable multimedia player (PMP), a personal digital assistant (PDA), an MP3 player, a mobile medical device, a desktop PC, a laptop PC, a netbook computer, a workstation, a navigation device, a vehicle navigation device, a vehicle display device, a vehicle device, a theater device, a theater display device, a television, a wallpaper device, a signage device, a game device, a notebook, a monitor, a camera, a camcorder, and a home appliance.

A display device according to an aspect and some embodiments of the present disclosure may be described as follows.

One embodiment of the present disclosure provides a display device comprising a display panel including pixels, data lines and gate lines; a data driver connected to the data lines; a gate driver connected to the gate lines; and a timing controller configured to control the data driver and the gate driver, wherein when a frame of the display panel has switched from a black frame to a gray frame, the timing controller is configured to output a scan signal having an adjusted pulse width for a gray frame immediately subsequent to the black frame.

In accordance with some embodiments of the display device, the timing controller is configured to provide a control signal for controlling at least one driving transistor of the pixel of the display panel to the gate driver.

In accordance with some embodiments of the display device, the gray frame immediately subsequent to the black frame includes a plurality of gray frames, wherein the timing controller is configured to insert an on bias timing into each of the plurality of gray frames.

In accordance with some embodiments of the display device, the timing controller is configured to adjust a pulse width of the scan pulse within a data scan period for each of the plurality of gray frames.

In accordance with some embodiments of the display device, a number of the plurality of gray frames is at least 2.

In accordance with some embodiments of the display device, the data scan period includes: an off-bias period for minimizing a difference between characteristics of a gate node of the driving transistor for different frames; an initialization period for initializing the gate node of the driving transistor; a sampling period for writing a data voltage to the gate node of the driving transistor; and an on-bias period between the data scan period and a bias scan period.

In accordance with some embodiments of the display device, the timing controller is configured to adjust a pulse width of at least one scan signal within each of the off-bias period and the initialization period.

In accordance with some embodiments of the display device, the timing controller is configured to control an output of each of a first scan signal, a second scan signal, a third scan signal, and a fourth scan signal.

In accordance with some embodiments of the display device, the timing controller is configured to control an output of the fourth scan signal by inserting a pulse indicating start of the on-bias timing into the fourth scan signal.

In accordance with some embodiments of the display device, the timing controller is configured to control an output of the fourth scan signal having the inserted pulse before the third scan signal is turned on.

In accordance with some embodiments of the display device, the on-bias timing is set to a period from a start time of the pulse inserted into the fourth scan signal to a timing at which the third scan signal starts to be turned off.

In accordance with some embodiments of the display device, the third scan signal includes a pulse turned on at the start time of the inserted pulse.

Although some embodiments of the present disclosure have been described above with reference to the accompanying drawings, the present disclosure may not be limited to some embodiments and may be implemented in various different forms. Those of ordinary skill in the technical field to which the present disclosure belongs will be able to appreciate that the present disclosure may be implemented in other specific forms without changing the technical idea or essential features of the present disclosure. Therefore, it should be understood that some embodiments as described above are not restrictive but illustrative in all respects.

What is claimed is:

1. A display device comprising:

a display panel including pixels, data lines, and gate lines;

a data driver connected to the data lines;

a gate driver connected to the gate lines; and a timing controller configured to control the data driver and the gate driver, wherein when the display panel has switched from a black frame to a group of gray frames, the gate driver is configured to output a scan signal having an adjusted pulse width for target gray frames among the group of gray frames, and wherein target gray frames are immediately subsequent to the black frame.

2. The display device of claim 1, wherein the gate driver is configured to insert an on bias timing into each of the target gray frames.

3. The display device of claim 2, wherein the gate driver is configured to adjust a pulse width of the scan signal within a data scan period for each of the target gray frames.

4. The display device of claim 3, wherein the data scan period includes:

an off-bias period that reduces a difference between voltages of a gate electrode of a driving transistor of each of the pixels for different frames;

an initialization period during which the gate electrode of the driving transistor is initialized;

a sampling period during which a data voltage is written to the gate electrode of the driving transistor; and an on-bias period that reduces a threshold voltage difference of the driving transistor between the data scan period and a bias scan period.

5. The display device of claim 4, wherein the gate driver is configured to adjust the pulse width of the scan signal within one of the off-bias period and the initialization period.

6. The display device of claim 4, wherein the gate driver is configured to control an output of each of a first scan signal, a second scan signal, a third scan signal, and a fourth scan signal.

7. The display device of claim 6, wherein the gate driver is configured to control an output of the fourth scan signal by inserting a pulse indicating a start of the on-bias period into the fourth scan signal.

8. The display device of claim 7, wherein the gate driver is configured to control an output of the fourth scan signal having the inserted pulse before the third scan signal is turned on.

9. The display device of claim 6, wherein the on-bias period is set to a period from a start time of the pulse inserted into the fourth scan signal to a timing at which the third scan signal starts to be turned off.

10. The display device of claim 9, wherein the third scan signal includes a pulse turned on at the start time of the inserted pulse.

11. The display device according to claim 6, wherein the third scan signal is used to apply a bias voltage to a source or a drain of the driving transistor, and the fourth scan signal is used to initialize a gate electrode of the driving transistor.

12. The display device of claim 2, wherein a number of the target gray frames is at least 2.

13. The display device according to claim 1, wherein the gate driver is configured to increase, for the target gray frames, an application time of a turn-on bias for initializing a gate electrode of a driving transistor of the pixels of the display panel.

* * * * *